United States Patent
Zhang

(10) Patent No.: US 12,014,665 B1
(45) Date of Patent: Jun. 18, 2024

(54) DISPLAY PANEL AND DISPLAY DEVICE

(71) Applicant: Wuhan Tianma Micro-Electronics Co., Ltd., Wuhan (CN)

(72) Inventor: Dian Zhang, Wuhan (CN)

(73) Assignee: Wuhan Tianma Micro-Electronics Co., Ltd., Wuhan (CN)

( * ) Notice: Subject to any disclaimer, the term of this patent is extended or adjusted under 35 U.S.C. 154(b) by 0 days.

(21) Appl. No.: 18/220,428

(22) Filed: Jul. 11, 2023

(30) Foreign Application Priority Data

Apr. 28, 2023 (CN) .......................... 202310503149.0

(51) Int. Cl.
*G09G 3/20* (2006.01)
*G09G 3/3208* (2016.01)

(52) U.S. Cl.
CPC ......... *G09G 3/2003* (2013.01); *G09G 3/3208* (2013.01); *G09G 2300/0426* (2013.01); *G09G 2310/0297* (2013.01); *G09G 2320/0209* (2013.01)

(58) Field of Classification Search
CPC ......... G09G 3/3233; G09G 2300/0426; G09G 3/2003; G09G 3/3208; G09G 2310/0297; G09G 2320/0209
See application file for complete search history.

(56) References Cited

U.S. PATENT DOCUMENTS

| | | | |
|---|---|---|---|
| 2023/0079966 A1* | 3/2023 | Lu | ........................ G09G 3/2003 345/694 |
| 2023/0178013 A1* | 6/2023 | Oh | ....................... G09G 3/2003 345/690 |

FOREIGN PATENT DOCUMENTS

| | | |
|---|---|---|
| CN | 108807426 A | 11/2018 |
| CN | 108831368 A | 11/2018 |
| CN | 112086063 A | 12/2020 |

\* cited by examiner

*Primary Examiner* — Kevin M Nguyen
(74) *Attorney, Agent, or Firm* — Anova Law Group, PLLC

(57) ABSTRACT

A display panel and a display device are provided. A first display area of the display panel is located at least one side of a second display area, and a first data line in the first display area is electrically connected to a demultiplexing unit through a first connection line segment and a second connection line segment. The second connection line segment is located between the adjacent first sub-data line and second sub-data line in the second display area, and a distance between the second connection line segment and the first sub-data line is smaller than a distance between the second connection line segment and the second sub-data line. The control terminal of the switch element in the demultiplexing unit corresponding to the first data line is connected to a same switch control line as the control terminal of the switch element corresponding to the first sub-data line.

19 Claims, 21 Drawing Sheets

DISPLAY PANEL AND DISPLAY DEVICE

CROSS-REFERENCE TO RELATED APPLICATION

This application claims the priority of Chinese Patent Application No. 202310503149.0, filed on Apr. 28, 2023, the content of which is incorporated by reference in its entirety.

TECHNICAL FIELD

The present disclosure generally relates to the field of display technologies and, more particularly, relates to a display panel and a display device.

BACKGROUND

From the era of cathode ray tube (CRT) to the era of liquid crystal display (LCD), and now to the era of organic light-emitting diode (OLED) and the era of light-emitting diode display, the display industry has now been closely related to people's daily lives, e.g., ranging from mobile phones, tablets, TVs and PCs, to smart wearable devices, VR, car displays, etc.

With the development of the display technologies, users have higher and higher requirements for display products, how to reduce the signal coupling problem in the display panel has become one of the urgent to-be-solved technical problems at this stage. The present disclosed display panels and display devices are direct to solve one or more problems set forth above and other problems in the arts.

SUMMARY

One aspect of the present disclosure provides a display panel. The display panel includes a display area including a first display area and a second display area. The first display area is located on at least one side of the second display area in a first direction. The display panel also includes a plurality of data lines extending in second direction and arranged in the first direction, and including a plurality of first data lines located in the first display area and a plurality of second data lines located in the second display area. The first direction intersects the second direction. Further, the display panel includes a plurality of first connection wirings including a first connection line segment and a second connection line segment electrically connected to each other. The first connection line segment extends in the first direction and connected to a first data line of the plurality of first data line, the second connection line segment extends in the second direction and located between two adjacent second data lines of the plurality of second data lines in the second display area, the second connection line segment is disposed on a same layer as the second data line, and the two adjacent second data lines are respectively a first sub-data line and a second sub-data line, and in the first direction, a distance between the second connection line segment and the first sub-data line is D1, a distance between the second connection line segment and the second sub-data line is D2, and D1<D2. Further, the display panel includes a plurality of demultiplexing units including at least two switch elements. The second data line is electrically connected to a switch element of the at least two switch elements, and the first data line is electrically connected to a switch element of the at least two switch elements through the first connection line segment and the second connection line segment, a control terminal of the switch element corresponding to the first data line connected to the second connection line segment and a control terminal of the switch element corresponding to the first sub-data line is connected to a same switch control line, and the control terminal of the switch element corresponding to the first data line connected to the second connection line segment and the control terminal of the switch element corresponding to the second sub-data line are connected to different switch control lines.

Another aspect of the present disclosure provides a display device. The display device includes a display panel. The display panel includes a display area including a first display area and a second display area. The first display area is located on at least one side of the second display area in a first direction. The display panel also includes a plurality of data lines extending in second direction and arranged in the first direction, and including a plurality of first data lines located in the first display area and a plurality of second data lines located in the second display area. The first direction intersects the second direction. Further, the display panel includes a plurality of first connection wirings including a first connection line segment and a second connection line segment electrically connected to each other. The first connection line segment extends in the first direction and connected to a first data line of the plurality of first data line, the second connection line segment extends in the second direction and located between two adjacent second data lines of the plurality of second data lines in the second display area, the second connection line segment is disposed on a same layer as the second data line, and the two adjacent second data lines are respectively a first sub-data line and a second sub-data line, and in the first direction, a distance between the second connection line segment and the first sub-data line is D1, a distance between the second connection line segment and the second sub-data line is D2, and D1<D2. Further, the display panel includes a plurality of demultiplexing units including at least two switch elements. The second data line is electrically connected to a switch element of the at least two switch elements, and the first data line is electrically connected to a switch element of the at least two switch elements through the first connection line segment and the second connection line segment, a control terminal of the switch element corresponding to the first data line connected to the second connection line segment and a control terminal of the switch element corresponding to the first sub-data line is connected to a same switch control line, and the control terminal of the switch element corresponding to the first data line connected to the second connection line segment and the control terminal of the switch element corresponding to the second sub-data line are connected to different switch control lines.

Other aspects of the present disclosure can be understood by those skilled in the art in light of the description, the claims, and the drawings of the present disclosure.

BRIEF DESCRIPTION OF THE DRAWINGS

To illustrate the technical solutions in the embodiments of the present disclosure more clearly, the following briefly introduces the accompanying drawings used in the description of the embodiments. Obviously, the accompanying drawings in the following description are only some embodiments of the present disclosure, for those of ordinary skill in the art, other drawings may also be obtained from these drawings without creative effort.

DETAILED DESCRIPTION

Various exemplary embodiments of the present disclosure will now be described in detail with reference to the accompanying drawings. It should be noted that the relative arrangements of components and steps, numerical expressions and numerical values set forth in these embodiments do not limit the scope of the present disclosure unless specifically stated otherwise.

The following description of at least one exemplary embodiment is merely illustrative in nature and in no way taken as limiting the disclosure, its application or uses.

Techniques, methods and devices known to those of ordinary skill in the relevant art may not be discussed in detail, but where appropriate, such techniques, methods and devices should be considered part of the description.

In all examples shown and discussed herein, any specific values should be construed as exemplary only, and not as limitations. Therefore, other instances of the exemplary embodiment may have different values.

It will be apparent to those skilled in the art that various modifications and variations can be made in the present disclosure without departing from the spirit or scope of the disclosure. Therefore, the present disclosure is intended to cover the modifications and variations of the present disclosure falling within the scope of the corresponding claims (technical solutions to be protected) and their equivalents. It should be noted that, the implementation manners provided in the embodiment of the present disclosure may be combined with each other if there is no contradiction.

It should be noted that like numerals and letters denote like items in the following figures, therefore, once an item is defined in one figure, it does not require further discussion in subsequent figures.

Figure 1:
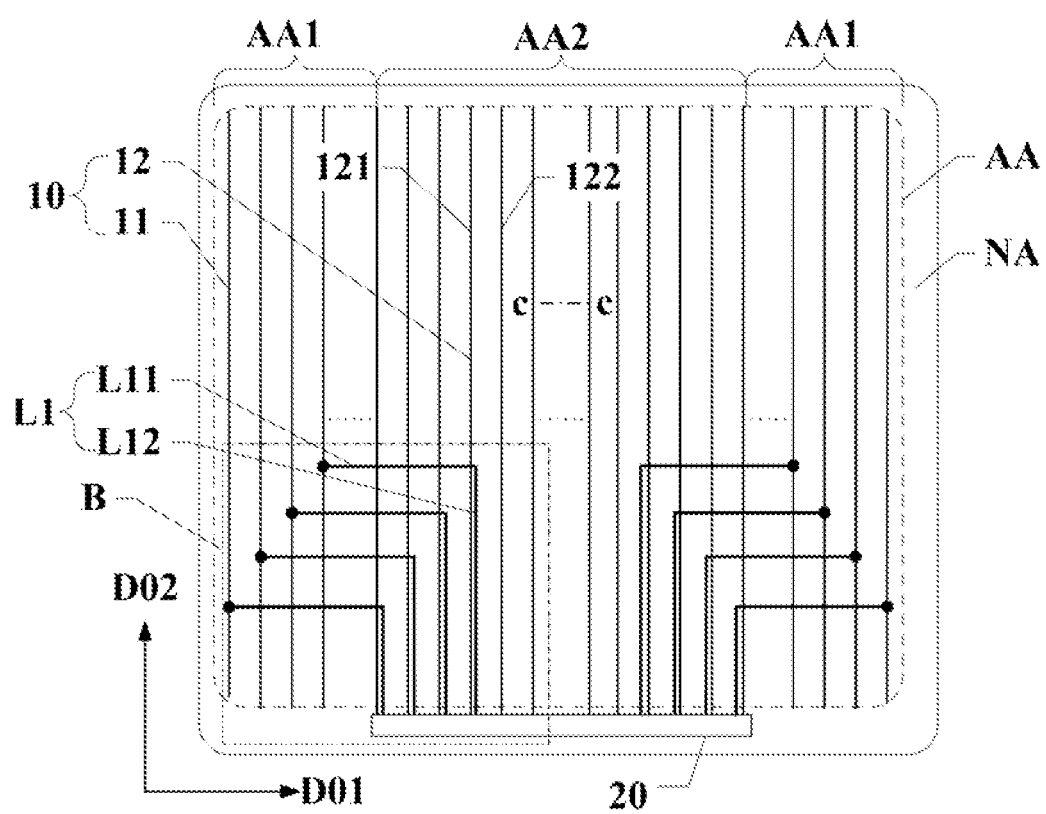
FIG. 1 illustrates a top view of an exemplary display panel according to various disclosed embodiments of the present disclosure.
Figure 2:
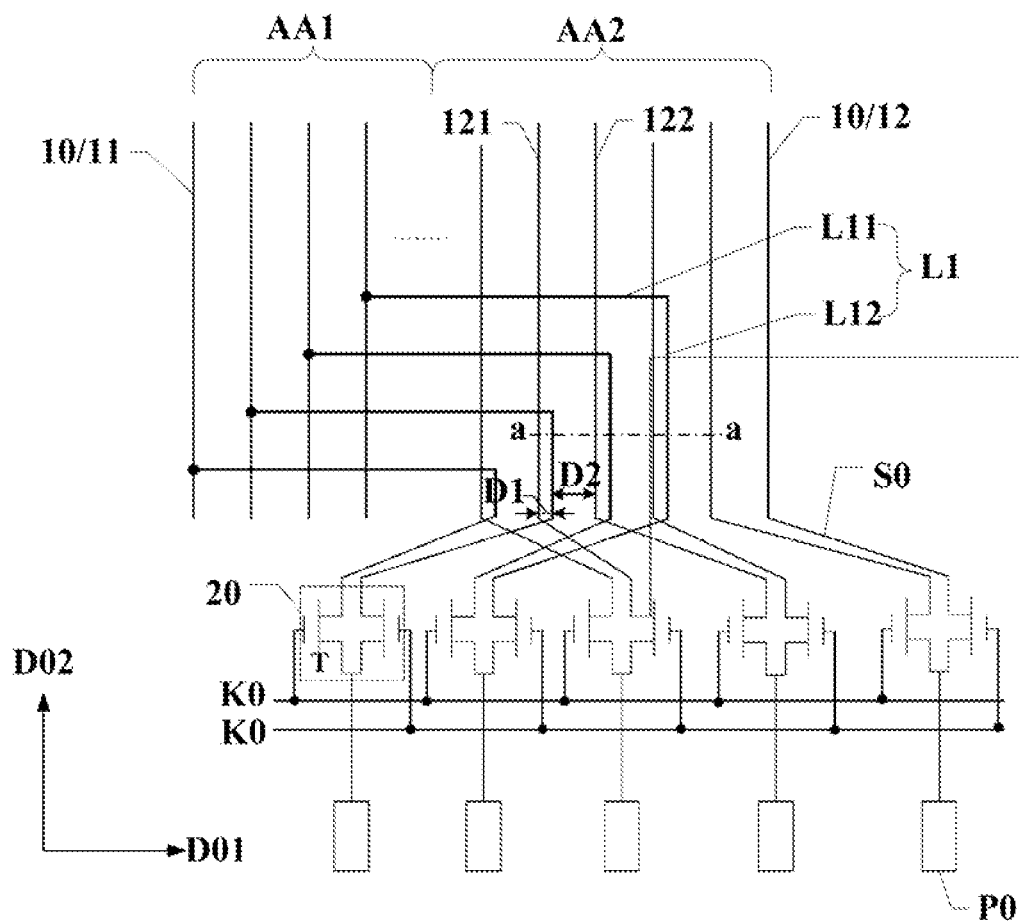
FIG. 2 is a zoomed-in of an area B in FIG. 1.
Figure 3:
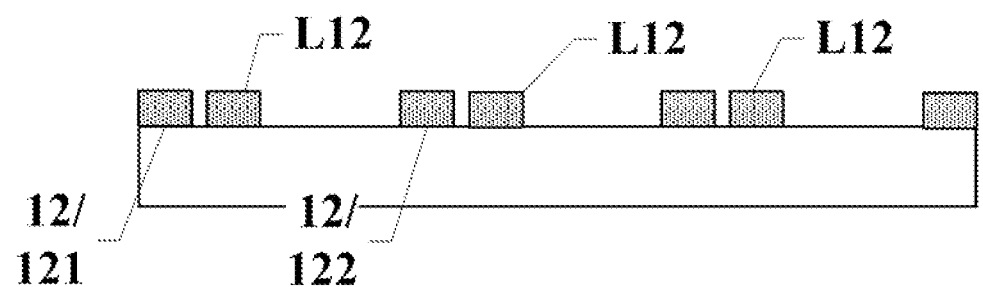
FIG. 3 is an aa-sectional view of the display panel in FIG. 1.

The present disclosure provides a display panel and a display device. FIG. 1 is a top view of an exemplary display panel according to various disclosed embodiments of the present disclosure. FIG. 2 is a zoomed-in schematic view of an area B in FIG. 1, and FIG. 3 is an aa-sectional view in FIG. 2.

As shown in FIG. 1 and FIG. 2, an exemplary display panel 100 provided by an embodiment of the present disclosure may include a display area AA. The display area AA may include a first display area AA1 and a second display area AA2. In the first direction D01, the first display area AA1 may be located at at least one side of the second display area AA2. In some embodiments, the second display area AA2 may be located in the middle area of the display panel, and the first display area AA1 may be located at one side or both sides of the display panel in the first direction D01. FIG. 1 is illustrated by taking the first display area AA1 provided at both sides of the second display area AA2 as an example.

The display area AA may include a plurality of data lines 10 extending in a second direction D02 and arranged in a first direction D01. The data lines 10 may include a plurality of first data lines 11 located in the first display area AA1 and a plurality of second data lines 12 located in the second display area AA2. The first direction D01 may intersect with the second direction D02. FIG. 1 only illustrates some of the data lines included on the display panel, and does not illustrate the number of data lines actually included on the display panel. FIG. 1 illustrates by taking the first data line 11 located at both sides of the second data line 12 in the first direction D01 as an example.

The display area AA may also include a plurality of first connection wirings L1. A first connection wiring of the plurality of first connection wirings L1 may include a first connection line segment L11 and a second connection line segment L12 electrically connected to each other. The first connection line segment L11 may extend in the first direction D01, and may be connected with the first data line 11. The second connection line segment L12 may extend in the second direction D02 and may be located between two adjacent second data lines 12 in the second display area AA2. Thus, the first signal line located in the first display area AA1 may obtain a signal through the second connection line segment L12 located in the second display area AA2. It should be noted that the extension of the first connecting line segment L11 in the first direction D01 may mean that the overall extending trend of the first connection line segment L11 may be in the first direction D01, and it does not limit that the first connection line segment L11 must be a straight line. Similarly, the fact that the second connection line segment L12 extends in the second direction D02 may mean that the overall extension trend of the second connection line segment L12 is the second direction D02, and it does not limit that the second connection line segment L12 must be a straight line.

Further, referring to FIG. 2 and FIG. 3, the second connection line segment L12 may be disposed on a same layer as the second data line 12, and the two adjacent second data lines 12 may be respectively the first sub-data line 121 and the second sub-data line 122. In the first direction D01, the distance between the second connection line segment L12 and the first sub-data line 121 may be D1, the distance between the second connection line segment L12 and the second sub-data line 122 may be D2, and D1<D2. In the second display area AA2, when the second connection line segment L12 and the second data line 12 are disposed on a same layer, there may be no need to introduce a new film layer for the second connection line segment L12, and it may be formed at the same time as the second data line 12, which may be beneficial to simplify the overall film layer structure of the display panel, save the number of masks in the manufacturing process, and improve the production efficiency of the display panel. In one embodiment, the first data line 11, the second data line 12, and the second connection line segment L12 may be disposed on a same layer such that the first data line 11, the second data line 12, and the second connection line segment L12 may be formed in one production process using a mask, which may be more conducive to simplifying the film layer structure of the display panel.

The display panel may also include a plurality of demultiplexing units 20. A demultiplexing unit 20 of the demultiplexing units 20 may include at least two switch elements T. The second data line 12 may be electrically connected to a switch element T. The first data line 11 may be electrically connected to a switch element T through the first connection line segment L11 and the second connection line segment L12. The control terminal of the switch element T corresponding to the first data line 11 connected to the second sub-data line segment and the control terminal of the switch element T corresponding to the first sub-data line 121 may be connected to a same switch control line K0. Further, the control terminal of the switch element T corresponding to the first data line 11 connected to the second connection line segment L12 and the control terminal of the switch element T corresponding to the second sub-data line 122 may be connected to different switch control lines K0.

Specifically, referring to FIG. 1 and FIG. 2, in the display panel provided by the embodiment of the present disclosure, in the first direction D01, the first display area AA1 in the display area may be located at both sides of the second display area AA2. The first connection line L1 connected to the first data line 11 may be introduced into the display panel, and the first connection line L1 may include the first connection line segment L11 extending in the first direction D01 and the second connection line segment L12 extending in the second direction D02. The second connection line segment L12 may be located in the second display area AA2. The two ends of the first connection line segment L11 may be respectively connected to the first data line 11 and the second connection line segment L12. The second connection line segment L12 may also be electrically connected to the switch element T of the demultiplexing unit 20. In this way, there may be no need to wire in the bottom left frame and/or bottom right frame of the display panel to realize the electrical connection between the first data line 11 and the demultiplexing unit 20, the electrical connection between the first data line 11 and the demultiplexing unit 20 may be realized through the electrical connection between the second connection line segment L12 in the second display area AA2 and the demultiplexing unit 20. Accordingly, a compressed space for the bottom left frame and/or the bottom right frame of the display panel may be provided, thus facilitating the realization of a narrow bezel of the product design. In one embodiment, to realize the electrical connection between the second data line 12 and the second connection line segment L12 and the switch elements T in the demultiplexing unit 20, a fan-out line S0 may also be introduced between the second display area AA2 and the demultiplexing unit 20.

Further, when the second connection line segment L12 is set in the second display area AA2, the second data lines 12 adjacent to the second connection line segment L12 may be respectively the first sub-data line 121 and the second sub-data line 122. In the first direction D01, the second connection line segment L12 may be closer to the first sub-data line 121 and farther away from the second sub-data line 122.

It should be noted that the first sub-data line 121 and the second sub-data line 122 are only relative. For two adjacent data lines located at two sides of the same second connection line segment L12 and adjacent to the second connection line segment L12, the second data line 12 closer to the second connection line segment L12 may be the first sub-data line 121, and the second data line 12 farther away from the second connection line segment L12 may be the second sub-data line 122. For a certain second data line 12, when it is adjacent to two second connection line segments L12, the second data line 12 may be the first sub-data line 121 of one second connection line segment L12, or the second sub-data line 122 of another second connection line segment L12.

In one embodiment, the distance D1 between the second connection line segment L12 and the first sub-data line 121 may refer to the width of the interval between the second connection line segment L12 and the first sub-data line 121 in the first direction D01, and the second distance D2 may refer to the width of the interval between the second connection line segment L12 and the second sub-data line 122 in the first direction D01. Both the first data line 11 and the second data line 12 may be electrically connected to the switch element T in the demultiplexing unit 20. The first data line 11 may be electrically connected to the aforementioned switch element T through the first connection line L1. The control terminal of the switch element T connected to the first data line 11 connected to the second connection line segment L12 and the control terminal of the switch element T connected to the first sub-data line 121 which is closer to the second connection line segment L12 may be connected to a same switch control line K0. In such a configuration, the first data line 11 connected to the second connection line segment L12 and the first sub-data line 121 adjacent to the second connection line segment L12 may be charged simultaneously. In the related art, when the first data line transmits a data signal and the second data line is in a state of waiting to receive a data signal among the two data lines that are relatively close to each other, the data signal transmitted on the first data line is very likely to affect the second data line, that is to say, coupling or crosstalk occurs between the two, which affects the display accuracy of the sub-pixels connected to the second data line.

However, in the display panel provided by the present disclosure, when the distance between the second connection line segment L12 and the first sub-data line 121 is relatively small, because the transmission of signals on the second connection line segment L12 and its adjacent first sub-data line 121 may be controlled by the same switch control line, for example, at a same time point, the second connection line segment L12 and the first sub-data line 121 adjacent to it may simultaneously transmit data signals, or may be both waiting to receive data signals at the same time. Thus, the phenomenon of signal coupling or crosstalk occurring between the second connection line segment L12 and the first sub-data line 121 that are relatively close to each other may be effectively reduced or avoided. Further, because the second connection line segment L12 may be far from the second sub-data line 122, even if the two are not charged at the same time, the probability of signal coupling or crosstalk may be relatively low. Thus, it may be beneficial to improve the accuracy and the stability of the signal transmitted by the data line, and the overall display effect of the display panel may be improved.

The relative positional relationship of the first connection line segment, the second connection line segment and the data line will be further described below in combination with the circuit diagram and the film layer diagram.

Figure 4:
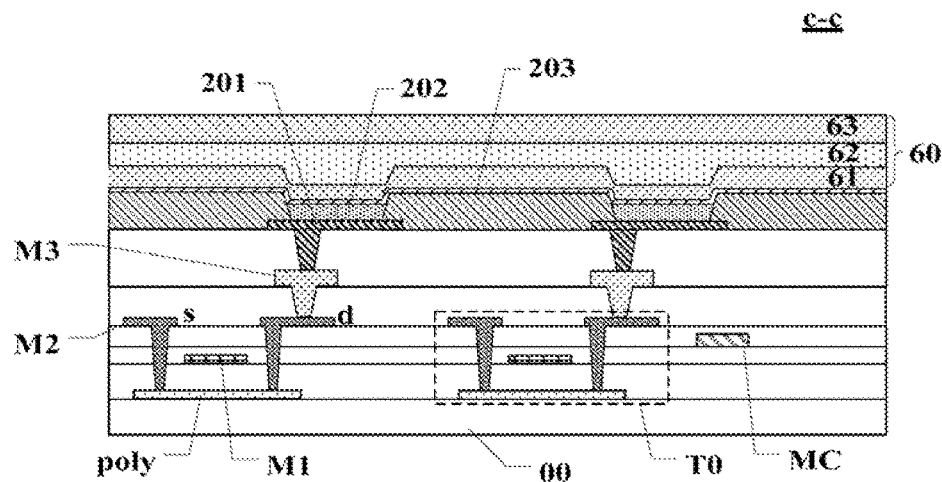
FIG. 4 is a cc-sectional view of the display panel in FIG. 1.

FIG. 4 is a cc-sectional view of the display panel in FIG. 1. The display panel may be a display panel using the organic light-emitting diode display technology, that is, organic light-emitting diode (OLED) display panel. The basic structure of the light-emitting functional layer of the OLED display panel may include an anode 201, a light-emitting material layer 202 and a cathode 203. When the power source supplies an appropriate voltage, the holes in the anode 201 and the electrons in the cathode 203 may combine in the light-emitting material layer to generate bright light. Compared with the thin-film field effect transistor liquid crystal displays, OLED display devices may have the characteristics of high visibility and high brightness, and may be more power-saving, lighter in weight, and thinner in thickness. Certainly, in some other embodiments of the present disclosure, the display panel may also be a display panel using an inorganic light-emitting diode display technology, such as a Micro LED display panel, or a Mini LED display panel, etc.

FIG. 4 only uses an OLED display panel for illustration. As shown in FIG. 4, in one embodiment, an encapsulation layer 60 may be further provided on the side of the cathode 203 away from the anode 201, and the display panel may include a substrate 00 and a first metal layer M1, a capacitor metal layer MC, a second metal layer M2 and a third metal layer M3 on one side of the substrate 00. The first metal layer M1 may be a gate metal layer, and the gates of transistors in the display panel may be disposed on the first metal layer M1. The capacitor metal layer MC may be used to form capacitor structures with the first metal layer M1 or the second metal layer M2. The source electrode s and the drain electrode d of the transistor T0 in the display panel may be located on the second metal layer M2. The semiconductor layer poly may include a source region and a drain region. The source region and the drain region may be formed by doping with N-type impurity ions or P-type impurity ions. The source electrode s of the transistor may be electrically connected to the source region of the semiconductor layer poly through the contact hole, and the drain electrode d of the transistor may be electrically connected to the drain region of the semiconductor layer poly through the contact hole. In one embodiment, the encapsulation layer 50 may be a thin-film encapsulation layer, including a first inorganic layer 61, an organic layer 62 and a second inorganic layer 63 for isolating water and oxygen and preventing external moisture and oxygen from affecting the light-emitting material layer 202.

Figure 5:
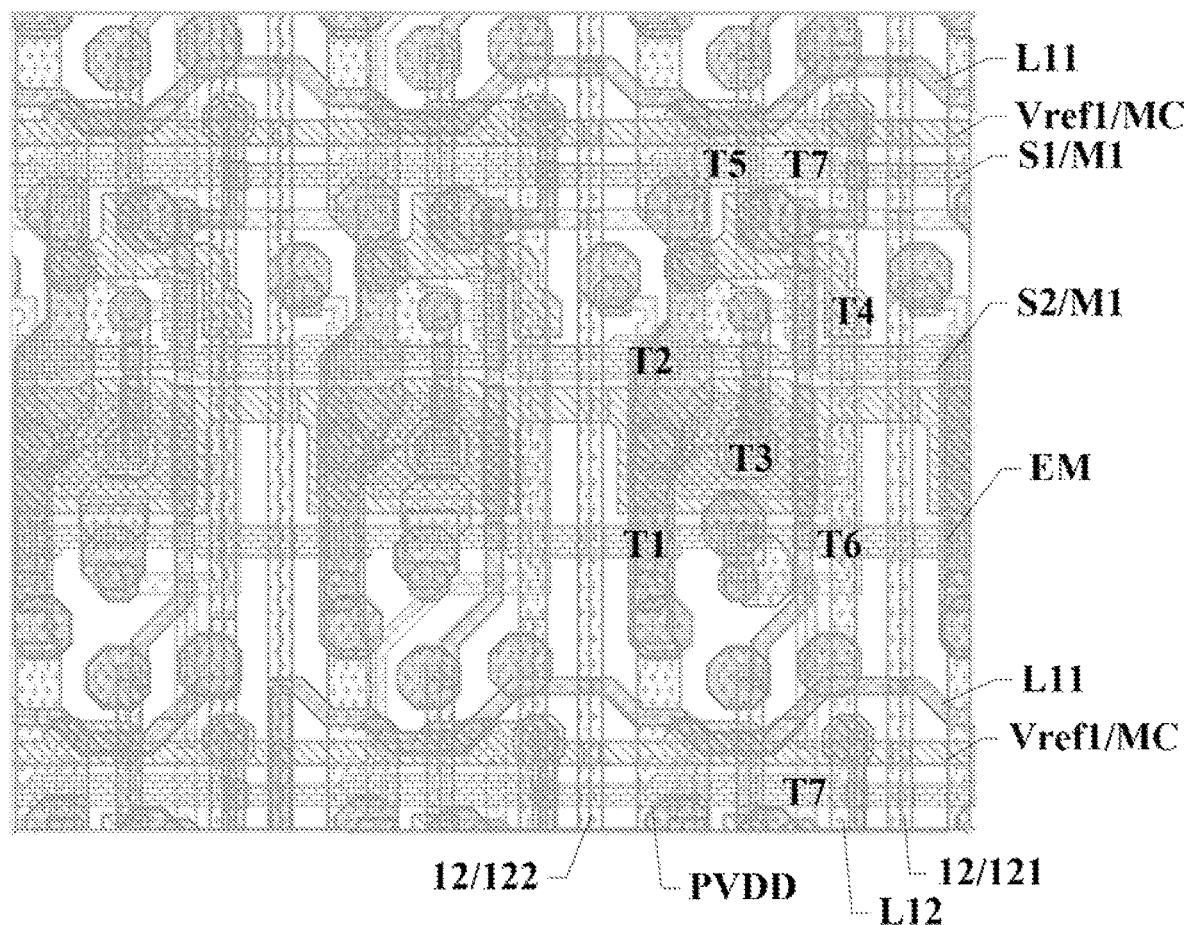
FIG. 5 is an overall layout of a portion of the pixel area of an exemplary display according to various disclosed embodiments of the present disclosure.
Figure 6:
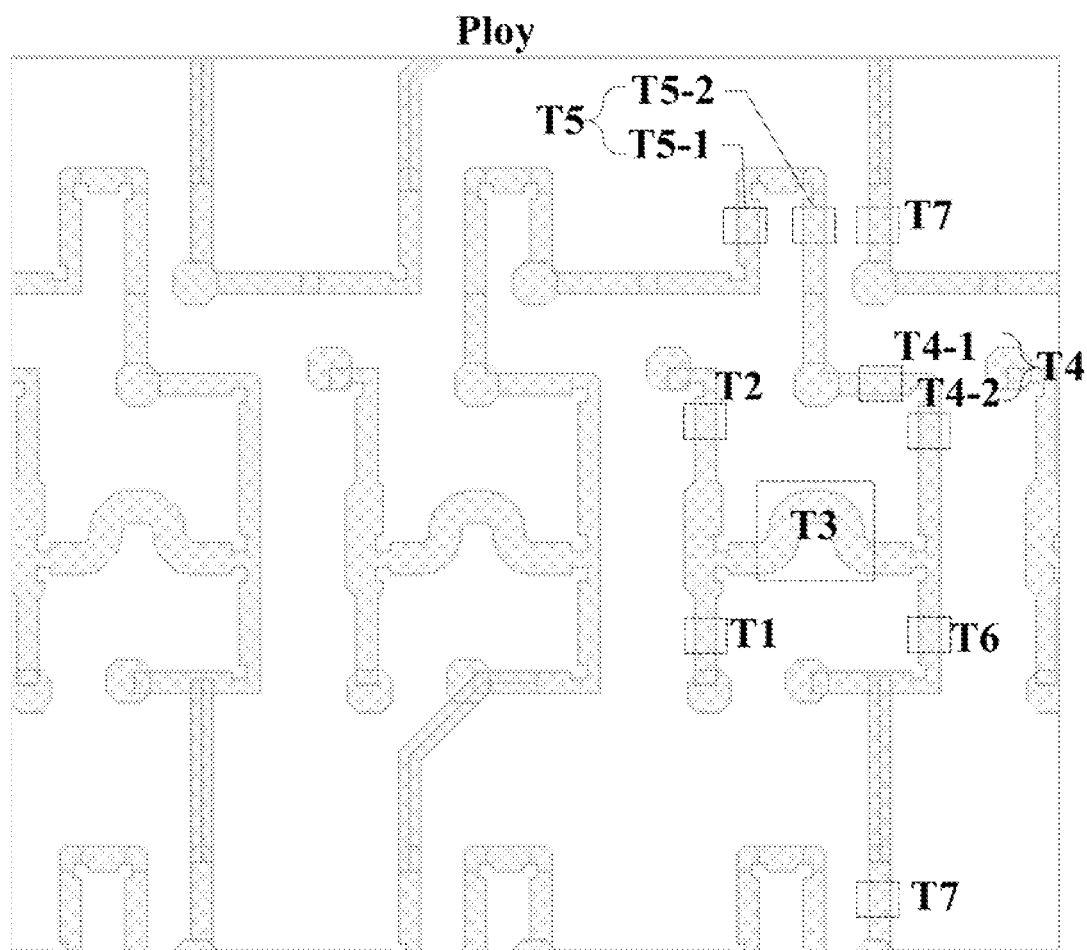
FIG. 6 is an exemplary top view of an active layer in FIG. 5.
Figure 7:
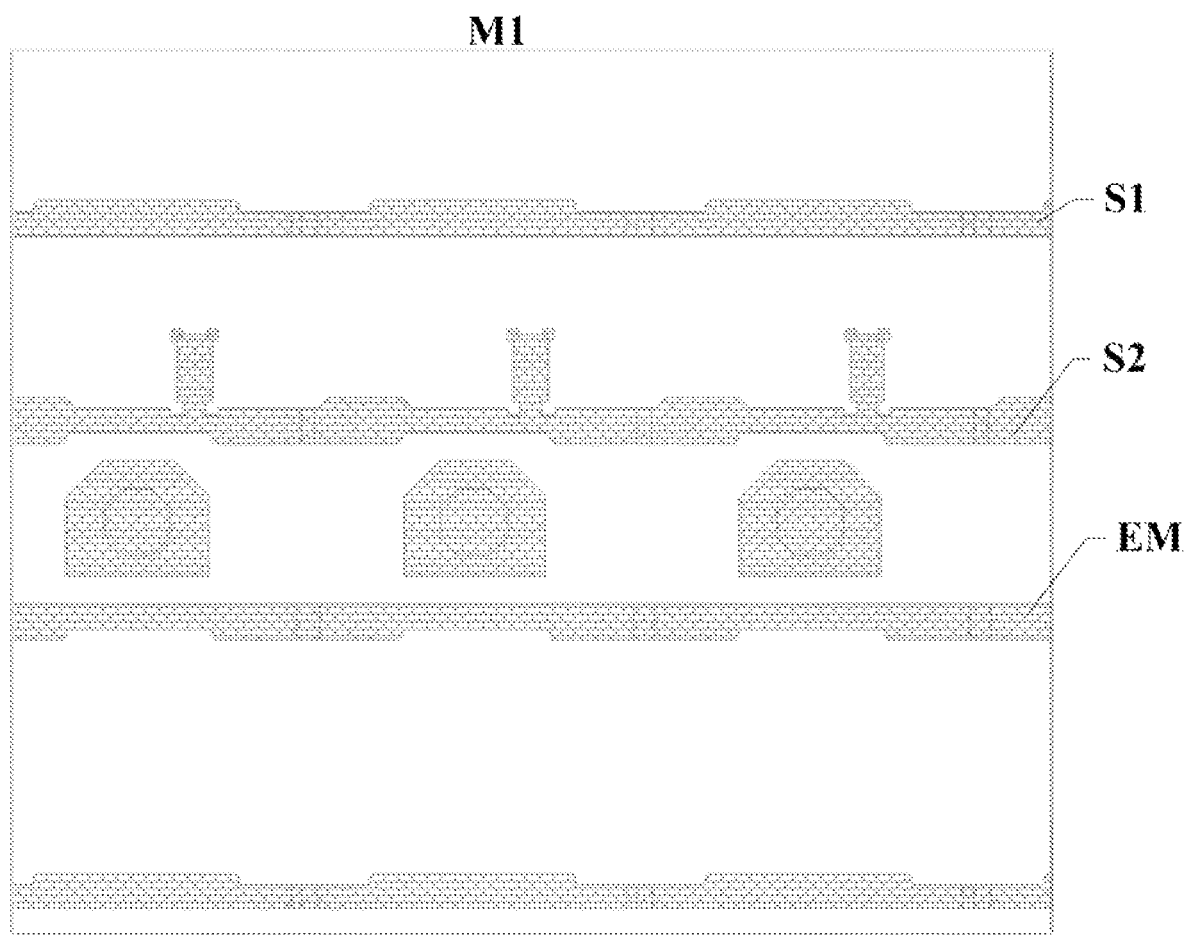
FIG. 7 is an exemplary top view of a first metal layer in FIG. 5.
Figure 8:
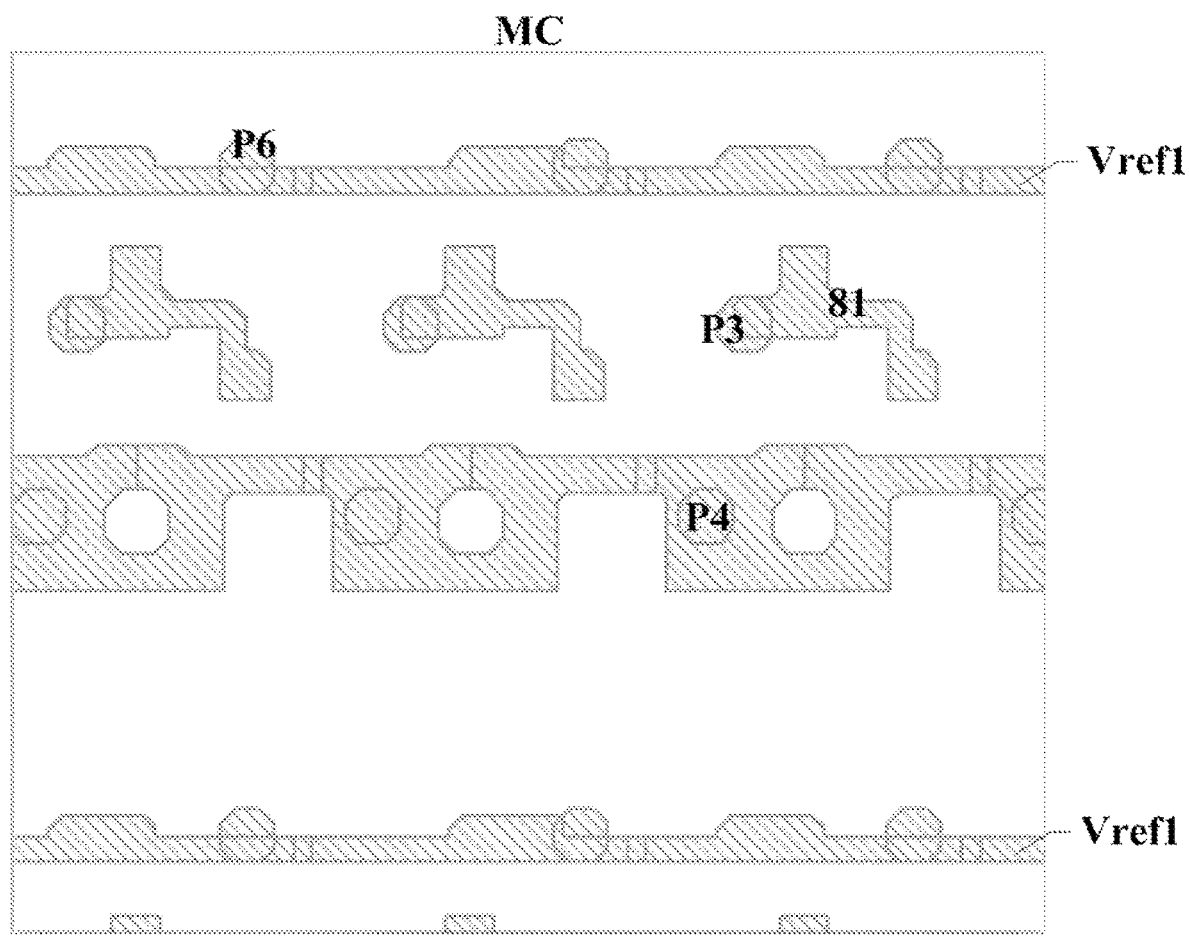
FIG. 8 is an exemplary top view of a capacitor metal layer in FIG. 5.
Figure 9:
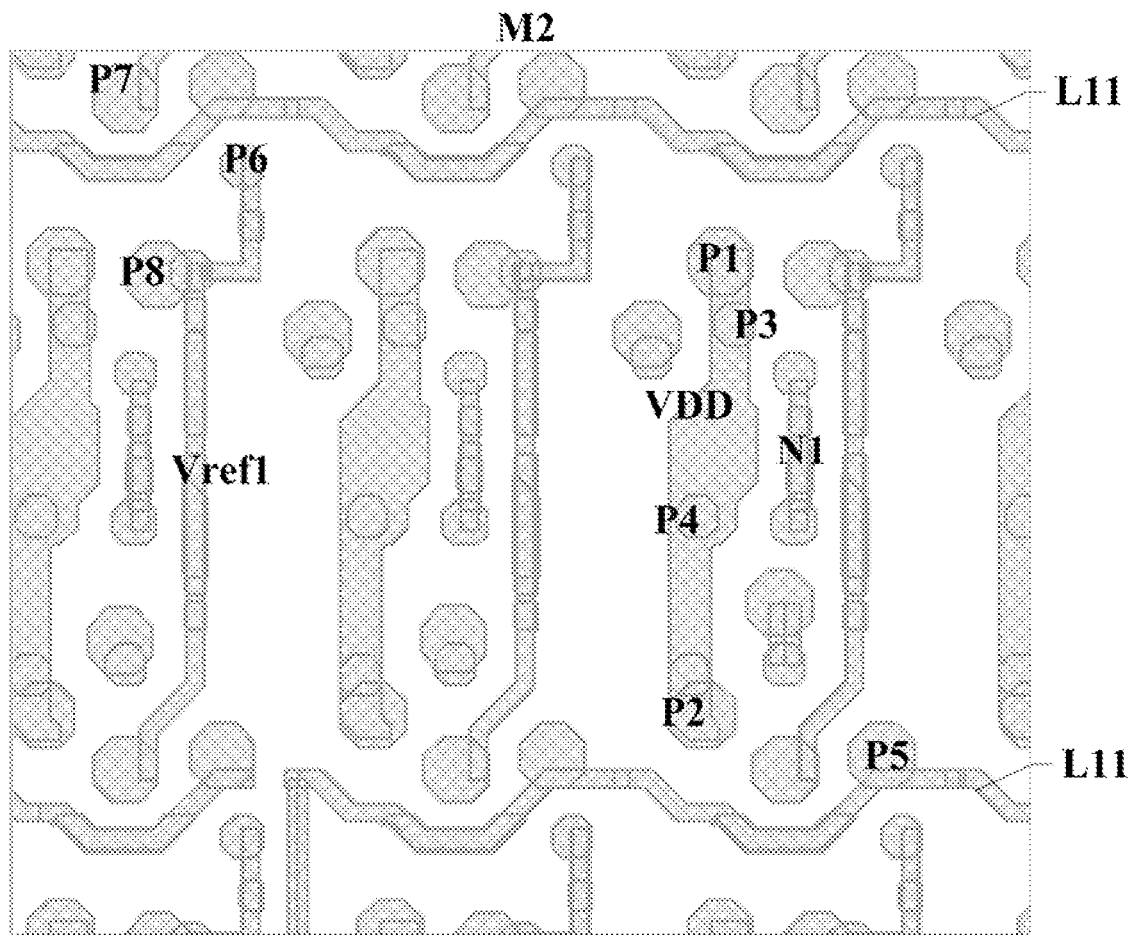
FIG. 9 is an exemplary top view of a second metal layer in FIG. 5.
Figure 10:
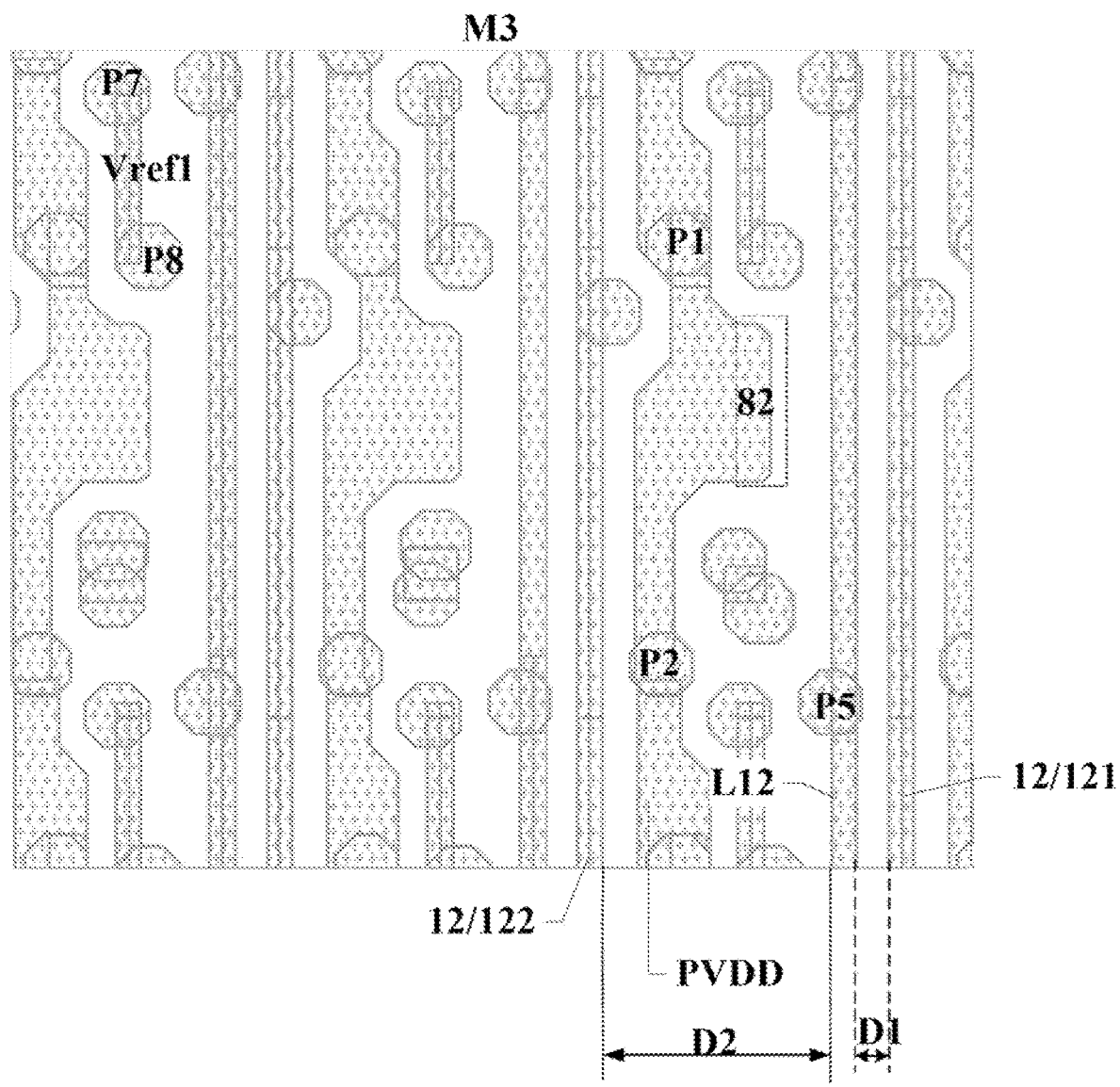
FIG. 10 is an exemplary top view of a third metal layer in FIG. 5.
Figure 11:
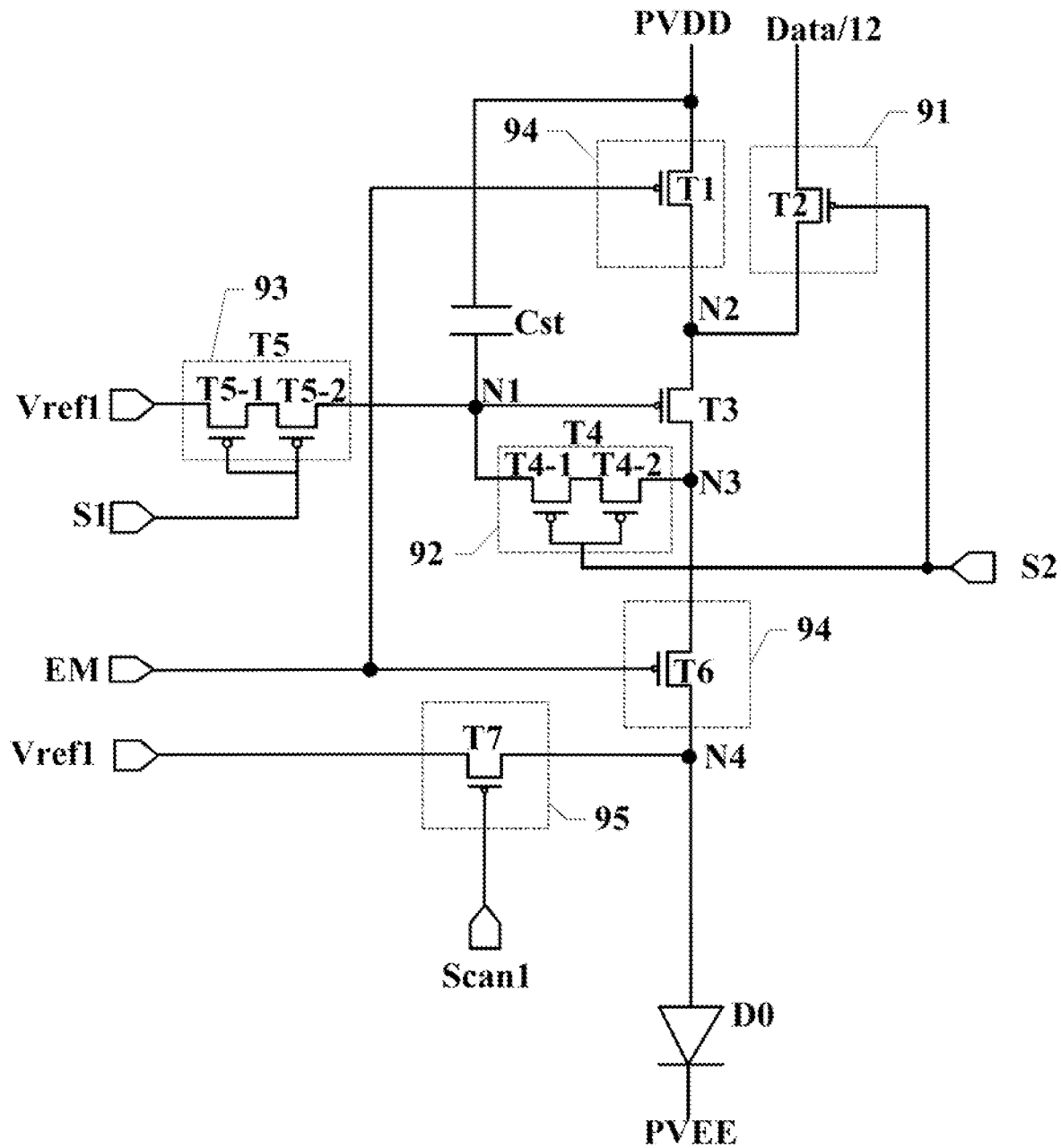
FIG. 11 is a pixel circuit diagram corresponding to a portion of the pixel area of an exemplary display panel according to various disclosed embodiments of the present disclosure.
Figure 12:
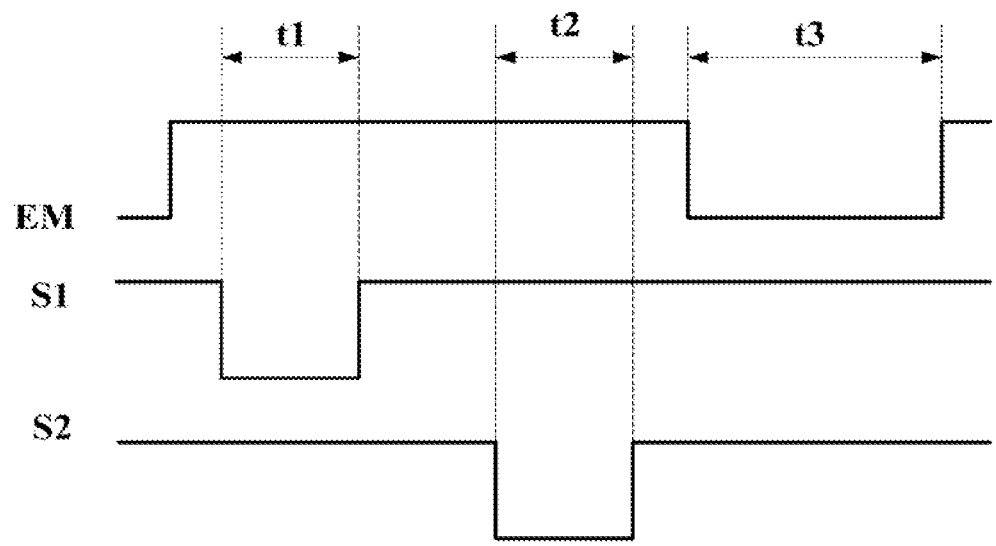
FIG. 12 is a sequence diagram corresponding to the pixel circuit in FIG. 11.

FIG. 5 illustrates an overall layout diagram of some pixel regions in an exemplary display panel according to various disclosed embodiments of the present disclosure. FIG. 6 illustrates a schematic top view of the active layer in FIG. 5. FIG. 7 illustrates a schematic top view of the first metal layer in FIG. 5. FIG. 8 illustrates a schematic top view of the capacitor metal layer in FIG. 5. FIG. 9 illustrates a schematic top view of the second metal layer in FIG. 5. FIG. 10 illustrates a schematic top view of the third metal layer in FIG. 5. FIG. 11 illustrates a schematic diagram of a pixel circuit corresponding to some pixel regions in the display panel. FIG. 12 illustrates a driving time sequence diagram corresponding to the pixel circuit in FIG. 11.

In the embodiment shown in FIGS. 5-10, the second connection line segment L12 and the second data line 12 may be located on the third metal layer M3, the first connection line segment L11 may be located on the second metal layer M2, the first scanning line S1, the second scanning line S2 and the light-emitting control signal line EM may be located on the first metal layer M1. The main portion of the first power signal line PVDD may be located on the third metal layer M3. The first power signal auxiliary line VDD may be located on the second metal layer M2. The first power signal auxiliary line VDD located on the second metal layer M2 may be electrically connected to the first power signal line PVDD of the third metal layer M3 through the first connection hole P1 and the second connection hole P2. Such a configuration may be beneficial to reduce the overall impedance of the first power signal line PVDD. A shielding layer 81 may be provided on the capacitor metal layer MC, and a capacitor may be formed between the shielding layer 81 and the double gate of the fourth transistor T4. The shielding layer 81 may be electrically connected to the first power signal line PVDD located in the second metal layer M2 through the third connection hole P3, and may have the same potential as the first power signal line PVDD. The fourth connection hole P4 may be used to electrically connect the capacitor plate on the capacitor metal layer MC to the first power signal auxiliary line VDD on the second metal layer M2 such that the capacitor substrate and the first power signal line PVDD may have a same potential. The first connection line segment L11 may be electrically connected to the second connection line segment L12 through the fifth connection hole P5. The horizontal line segment of the first reset signal line Vref1 may be located in the capacitor metal layer MC. For the longitudinal line segment of the first reset signal line Vref1, a portion may be located in the second metal layer M2, and a portion may be located in the third metal layer M3. The portion of the first reset signal line Vref1 on the second metal layer M2 may be electrically connected to the first reset signal line Vref1 on the capacitor metal layer MC through the sixth connection hole P6, and the portion of the first reset signal line Vref1 on the third metal layer M3 may be respectively electrically connected to the first reset signal line Vref1 located in the second metal layer M2 through the seventh connection hole P7 and the eighth connection hole P8. In such a configuration, the entire first reset signal line Vref1 located in the capacitor metal layer MC, the second metal layer M2 and the third metal layer M3 may form a grid structure. In the third metal layer M3, the widened portion of the first power signal line PVDD may be used as the shielding layer 82 for shielding the interference of the anode of the light-emitting element on the first node N1 in the pixel circuit to maintain a stable potential of the first node.

It should be noted that the film layers where the signal lines are located in FIGS. 5-10 are all schematic diagrams, and the film layers where each signal line is located are not limited. The possible film layer settings of these signal lines will be described in subsequent embodiments.

In the present disclosure, the second connection line segment L12 and the second data line 12 may be arranged on the same film layer, for example, FIG. 5 and FIG. 10 show that the second connection line segment L12 and the second data line 12 are arranged on the third metal layer M3. The distance D1 between the second connection line segment L12 and its adjacent first sub-data line 121 may be regarded as the width of the interval between the second connection line segment L12 and the first sub-data line 121. Similarly, the distance D2 between the second connection line segment L12 and its adjacent second sub-data line 122 may be regarded as the width of the interval between the second connection line segment L12 and the second sub-data line 122. Referring to FIG. 2, FIG. 5 and FIG. 10, the embodiment of the present disclosure may realize simultaneous charging of the first data line 11 connected to the second connection line segment L12 and the first sub-data line 121 that is closer to the second connection line segment L12. Therefore, when the distance between the second connection line segment L12 and the first sub-data line 121 is relatively small, because the second connection line segment L12 and the first sub-data line 121 adjacent to it may be charged at the same time or may be in the state of waiting to receive a data signal at the same time, the signal coupling or crosstalk between the second connection line segment L12 and the first sub-data line 121 that are relatively close to each other may be effectively reduced or avoided. In addition, because the second connection line segment L12 may be far from the second sub-data line 122, even if the two are not charged at the same time, the probability of signal coupling or crosstalk may be relatively low, and it may be beneficial to improve the accuracy and stability of the signal transmitted by the data line. Thus, the overall display effect of the display panel may be improved.

In one embodiment, referring to FIG. 11, the pixel circuit may include a driving transistor T3, a data writing module 91, a compensation module 92, a first reset module 93, a light-emitting control module 94 and a second reset module 95. The gate of the driving transistor T3 may be connected to the first node N1, the first terminal of the driving transistor T3 may be connected to the second node N2, and the second terminal of the driving transistor T3 may be connected to the third node N3. In one embodiment, the data writing module 91 may include a second transistor T2, the light-emitting control module 94 may include a first transistor T1 and a sixth transistor T5. The compensation module 92 may include a fourth transistor T4, and the first reset module 93 may include a fifth transistor T5. The second reset module 95 may include a seventh transistor T7. The terminals of the fifth transistor T5 in the first reset module 93 may be respectively connected to the first reset signal line Vref1 and the first node N1, and the gate of the fifth transistor T5 in the first reset module 93 may be connected to the first scan line S1. The terminals of the second transistor T2 in the data writing module 91 may be respectively connected to the data line Data and the second node N2, the gate of the second transistor T2 in the data writing module 91 and the gate of the seventh transistor T7 in the second reset module 95 may be electrically connected to the second scan line S2. The terminals of the first transistor T1 in the light-emitting control module 94 may be respectively connected to the first power signal line PVDD and the second node N2, and the gate of the first transistor T1 may by electrically connected to the light-emitting control line EM. The terminals of the seventh transistor T7 in the second reset module 95 may be respectively connected to the first reset signal line Vref1 and the fourth node N4, the fourth node N4 may be connected to the anode of the light-emitting element DO, and the cathode of the light-emitting element DO may be connected to the second power signal line PVEE. It should be noted that, in the driving circuit of this embodiment, it is only described by taking each transistor as a P-type transistor as an example, but the type of the transistors is not limited. In FIG. 11, the fourth transistor T4 and the fifth transistor T5 are illustrated as examples of double-gate structure transistors. The double-gate structure transistors may have a small on-state leakage current, which may be conducive to reducing the influence of the leakage current of the fourth transistor T4 and the fifth transistor T5 on the potential of the first node N1.

Referring to FIG. 11 and FIG. 12, within the time period of one frame, the display panel may perform a first reset stage t1, a data writing stage t2 and a light-emitting stage t3. In the first reset stage t1, the first scanning line Scan1 may provide a low-level signal to the fifth transistor T5, the fifth transistor T5 may be turned on, and the reset signal may be transmitted to the driving transistor T3 for resetting the gate of the driving transistor T3. In the data writing stage t2, the second scan line Scan2 may provide a low-level signal to the second transistor T2, the fourth transistor T4 and the seventh transistor T7, the second transistor T2, the fourth transistor T4 and the seventh transistor T7 may be turned on, the data signal may be written into the gate of the driving transistor T3 (or referred to as threshold grabbing of the driving transistor T3), and the reset signal may be transmitted to the fourth node N4 to reset the anode of the light-emitting element DO. In the light-emitting stage t3, the light-emitting control line EM may provide a low-level signal to the first transistor T1 and the sixth transistor T6, the first transistor T1 and the sixth transistor T6 may be turned on, and the signal on the power signal line PVDD may be transmitted to the driving transistor T3, the light-emitting element DO may emit light in response to the driving signal of the driving transistor T3.

Further, referring to FIG. 2 and FIG. 10, in one embodiment of the present disclosure, in the first direction D01, the distance between the second connection line segment L12 and the first sub-data line 121 may be 2 µm≤D1≤3 µm.

In the embodiment of the present disclosure, the second connection line segment L12 may be disposed on a same layer as the second data line 12 in the second display area AA2, for example, the second connection line segment L12 may be disposed on the same layer as the first sub-data line 121. When the distance between the second connection line segment L12 and the first sub-data line 121 set in the same layer is relatively small, for example, less than 2 μm, it may increase the manufacturing difficulty of the second connection line segment L12 and the first sub-data line 121, and it may also increase the risk of short circuit between the second connection line segment L12 and the first sub-data line 121. Considering that the distance between the first sub-data line 121 and the second sub-data line 122 adjacent to the second connection line segment L12 may be fixed, if the distance between the second connection line segment L12 and the first sub-data line 121 is relatively large, for example, when it is greater than 3 μm, the distance between the second connection line segment L12 and the second sub-data line 122 may become smaller. Considering that the second connection line segment L12 and the second sub-data line 122 may be connected to different switch control lines K0, at the same moment, one of the second connection line segment L12 and the second sub-data line 122 may be charging, and the other may be waiting to receive data signals, if the distance is relatively small, the risk of signal coupling between the second connection line segment L12 and the second sub-data line 122 may increase, affecting the display accuracy of the display panel. Therefore, in the embodiment of the present disclosure, when the distance between the second connection line segment L12 and the first sub-data line 121 adjacent to the second connection line segment L12 is set to be 2 μm≤D1≤3 μm, it may ensure that the second connection line segment L12 and the first sub-data line adjacent to the second connection line segment L12 may have a certain interval between the second connection line segment L12 and the first sub-data line 121 adjacent to the second connection line segment L12, avoiding the problem of short circuit between the second connection line segment L12 and the first sub-data line 121 adjacent to the second connection line segment L12, simplifying the difficulty of making the second connection line segment L12 and the first sub-data line 121, and ensuring that the second connection line segment L12 and the first sub-data line 121 adjacent to the second connection line segment L12 may have a larger interval to reduce or avoid the problem of signal coupling between the second connection line segment L12 and the first sub-data line 121 adjacent to the second connection line segment L12.

It should be noted that the configuration that the second connection line segment L12 mentioned in the embodiment of the present disclosure is adjacent to the first sub-data line 121 may refer to that no other data lines are set between the second connection line segment L12 and the first sub-data line 121 in the first direction D01, and the configuration that the second connection line segment L12 is adjacent to the second sub-data line 122 may mean that no other data line is arranged between the second connection line segment L12 and the second sub-data line 122 in the first direction D01.

Further, referring to FIG. 2 and FIG. 10, in one embodiment of the present disclosure, in the first direction D01, the distance D2 between the second connection line segment L12 and its adjacent second sub-data line 122 and the distance D1 between the second connection line segment L12 and the first sub-data line 121 adjacent to it may have relationship of D2/D1≥15.

Specifically, when the second connection line segment L12 is arranged between the first sub-data line 121 and the second sub-data line 122 in the second display area AA2, the second connection line segment L12 may be set to be closer to the first sub-data line 121 and away from the second sub-data line 122. This embodiment defines that the distance between the second connection line segment L12 and the second sub-data line 122 may be at least 15 times of the distance between the second connection line segment L12 and the first sub-data line 121. Such a configuration may be beneficial to ensure that the distance between the second connection line segment L12 and the second sub-data line 122 may be large enough to reduce or avoid the problem of signal crosstalk between the second connection line segment L12 and the second sub-data line 122. In one embodiment, depending on the pixel density of the product, the distance D2 between the second connection line segment L12 and its adjacent second sub-data line 122 may be approximately tens of microns, for example, about 50 microns, or about 60 microns, etc., but does not actually limit the value of D2.

Further, referring to FIG. 2, in one embodiment of the present disclosure, the demultiplexing unit 20 may include two switch elements T. The input terminals of the two switch elements T may be connected, and the output terminals of the two switch elements T of the same demultiplexing unit 20 may be connected to different data lines 10 in one-to-one correspondence. The control terminals of the two switch elements T of the demultiplexing unit 20 may be connected to the two switch control lines K0 in one-to-one correspondence.

It should be noted that the connection or electrical connection mentioned in the embodiments of the present disclosure may be a direct connection between two connection bodies, or a signal connection between two connection bodies through other line segments, such a switch element T (such as a transistor). For example, the output terminal of the switch element T may be connected to the first data line 11 through a first connection line L1.

Further, referring to FIG. 2, in one embodiment, the demultiplexing unit 20 may correspond to two switch control lines K0, and the two switch elements T in one demultiplexing unit 20 may be respectively connected to different switch control lines K0, and may be controlled by different switch control lines K0 to control the switch elements T in the same demultiplexing unit 20 to be turned on in a time division. In one embodiment, a conductive pad P0 may be disposed on the side of the demultiplexing unit 20 away from the display area, and the input terminals of the two switch elements T in the same demultiplexing unit 20 may be connected to the same conductive pad P0, which may reduce the number of conductive pads P0 in the display panel. In one embodiment, the conductive pads P0 may be used for bonding with the control chip. When the number of conductive pads P0 in the bonding area is reduced, the number of conductive pads P0 on the control chip may also be reduced, which may be conducive to simplifying the structure of the control chip to which the conductive pad P0 is bound.

Figure 13:
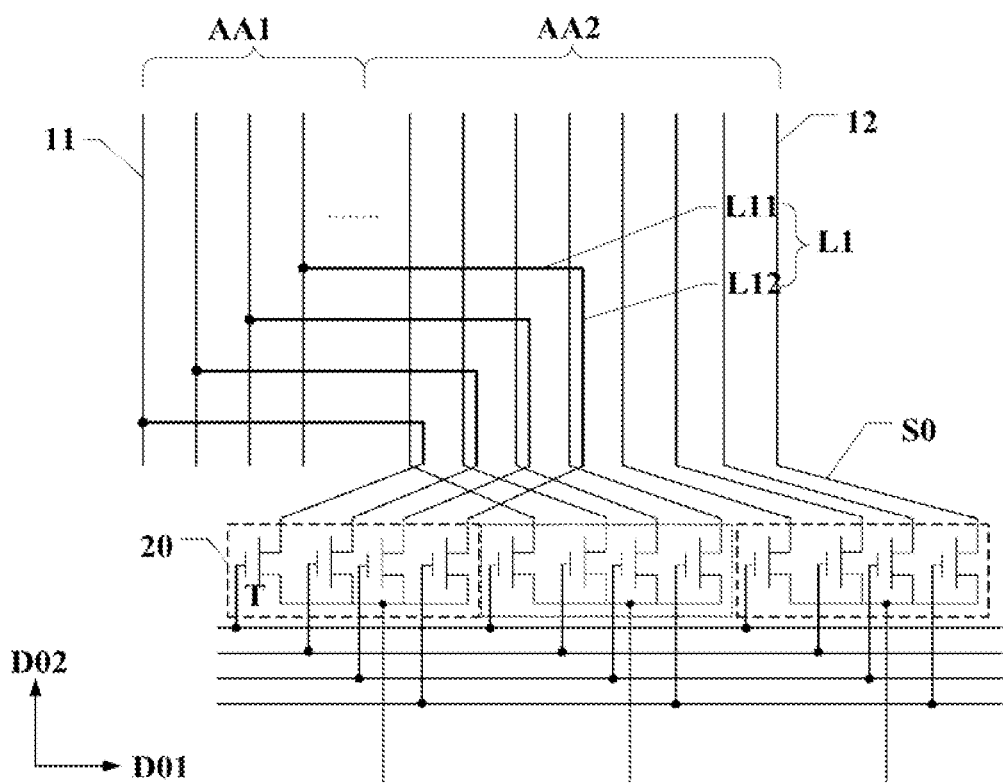
FIG. 13 is another exemplary zoomed-in view of the area B in FIG. 1.

In one embodiment, the configuration that a demultiplexing unit 20 includes two switch elements T is used as an example for illustration, but the number of switch elements T actually included in a demultiplexing unit 20 is not limited. In some other embodiments of the present disclosure, one demultiplexing unit 20 may also include three or more switch elements T. For example, as shown FIG. 13 which is another enlarged schematic view of area B in FIG. 1, the demultiplexing unit 20 may include four switch elements T.

In one embodiment, the switch element T in the demultiplexing unit 20 may be an NMOS transistor. When a high-level signal is applied to the control terminal of the NMOS transistor, the corresponding switching element T may be turned on; otherwise, when a low-level signal is applied to the control terminal of the NMOS transistor, the corresponding switch element T may be turned off.

In some other embodiments of the present disclosure, the switch element T in the demultiplexing unit 20 may also be a PMOS transistor. When a low-level signal is applied to the control terminal of the PMOS transistor, the corresponding switch element T may be turned on. Conversely, when a high-level signal is applied to the control terminal of the PMOS transistor, the corresponding switch element T may be turned off.

In one embodiment, the switch elements T in the same demultiplexing unit 20 may all be NMOS transistors or may all be PMOS transistors.

Figure 14:
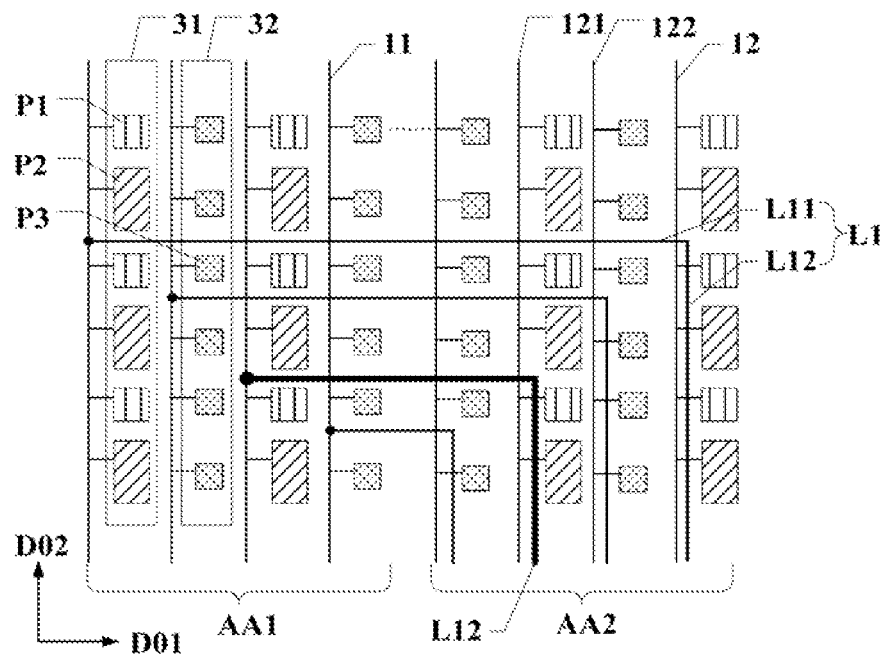
FIG. 14 is an exemplary connection between the sub-pixels and data lines according to various disclosed embodiments of the present disclosure.

FIG. 14 is a diagram showing a connection relationship between sub-pixels and data lines in one embodiment of the present disclosure. This embodiment only illustrates one pixel arrangement of the display panel, and does not limit the actual pixel arrangement structure of the display panel.

As shown in FIG. 14, in one embodiment of the present disclosure, the display panel may include a first pixel column 31 and a second pixel column 32 arranged in the first direction D01. The first pixel column 31 may include sub-pixels P1 of first color and sub-pixels P2 of a second color arranged in the second direction D02, and the second pixel column 32 may include sub-pixels P3 of a third color arranged in the second direction D02. At least one first data line connected by the second connection line segment L12 may be electrically connected to the first pixel column 31 in the first display area AA1, and the first sub-data line 121 adjacent to the second connection line segment L12 may be electrically connected to the first pixel column 31 in the second display area AA2.

In the pixel arrangement structure shown in this embodiment, the first pixel column 31 and the second pixel column 32 may be arranged in the first direction D01. The first pixel column 31 may include sub-pixels of two colors arranged alternately, and the second pixel column 32 may include sub-pixels of only one color. The first data line 11 mentioned in this embodiment may be electrically connected to the first pixel column 31, which may refer to that the first data line 11 may be electrically connected to the sub-pixel P1 of the first color and the first pixel column 31 in the first display area AA1. The configuration that the first sub-data line 121 may be electrically connected to the first pixel column 31 may refer to that the first sub-data line 121 may be electrically connected to the sub-pixel P1 of the first color in the first pixel column 31 in the second display area AA2 and the sub-pixel P2 of the second color.

In one embodiment, taking the second connection line segment L12 counted from left to right as an example, the pixel column connected by the first data line 11 connected to the second connection line segment L12 and the first sub-data line 121 adjacent to the second connection line segment L12 may be the first pixel column 31. The pixel column connected by the first data line 11 connected by the second connection line segment L12 may be the first pixel column 31 in the first display area AA1. The pixel column connected to the first sub-data line 121 may the first pixel column 31 in the second display area AA2. Referring to FIG. 2, because the first data line 11 connected to the second connection line segment L12 and the control terminal of the switch element T corresponding to the first sub-data line 121 adjacent to the second connection line segment L12 may be controlled by a same switch control line, the first data line 11 and the first sub-data line 121 may be charged at the same time. When the sub-pixels connected to the first data line 11 and the first sub-data line 121 are all sub-pixels in the first pixel column 31, the voltage values of the data signals transmitted by the first data line 11 and the first sub-data line 121 to different first pixel columns 31 may be more similar, which may be more conducive to reducing the problem of signal coupling or crosstalk between the first data line 11 and the first sub-data line 121; and may be beneficial to improve the display accuracy of the display panel.

Further, referring to FIG. 14, in one embodiment, the display panel may include a first pixel column 31 and a second pixel column 32 arranged in the first direction D01. The first pixel column 31 may include the sub-pixel P1 of a first color and the sub-pixel P2 of a second color arranged in the second direction D02. The second pixel column 32 may include sub-pixels P3 of a third color arranged in the second direction D02. At least one data line connected by the second connection line segment L12 may be electrically connected with the second pixel column 32 in the first display area AA1. The first sub-data line 121 adjacent to the second connection line segment L12 may be electrically connected to the second pixel column 32 in the second display area AA2.

The configuration that the first data line 11 is electrically connected to the second pixel column 32 may mean that the first data line 11 may be electrically connected to the sub-pixel P3 of the third color in the second pixel column 32 of the first display area AA1. The configuration that the first sub-data line 121 mentioned above is electrically connected to the second pixel column 32 may refer to that the first sub-data line 121 may be electrically connected to the sub-pixel P3 of the third color in the second pixel column 32 of the second display area AA2.

In one embodiment, taking the second connection line segment L12 counted from left to right as an example, the pixel columns connected with the first data line 11 connected to the second connection line segment L12 and the first sub-data line 121 adjacent to the second connection line segment L12 may all be the second pixel columns 32. The pixel columns connected by the first data line 11 connected by the second connection line segment L12 may be the second pixel column 32 in the first display area AA1. The pixel column connected with the first sub-data line 121 may be the second pixel column 32 in the second display area AA2. Referring to FIG. 2, because the first data line 11 connected to the second connection line segment L12 and the control terminal of the switch element T corresponding to the first sub-data line 121 adjacent to the second connection line segment L12 may be controlled by a same switch control line, the first data line 11 and the first sub-data line 121 may be charged at the same time. When the sub-pixels connected to the first data line 11 and the first sub-data line 121 are all sub-pixels in the second pixel column 32, the voltage values of the data signals transmitted by the first data line 11 and the first sub-data line 121 to the third color sub-pixel P3 in different second pixel columns 32 may be same or similar, which may be more conducive to reducing the problem of signal coupling or crosstalk occurring between the first data line 11 and the first sub-data line 121, and may be beneficial to improving the display accuracy of the display panel.

Figure 15:
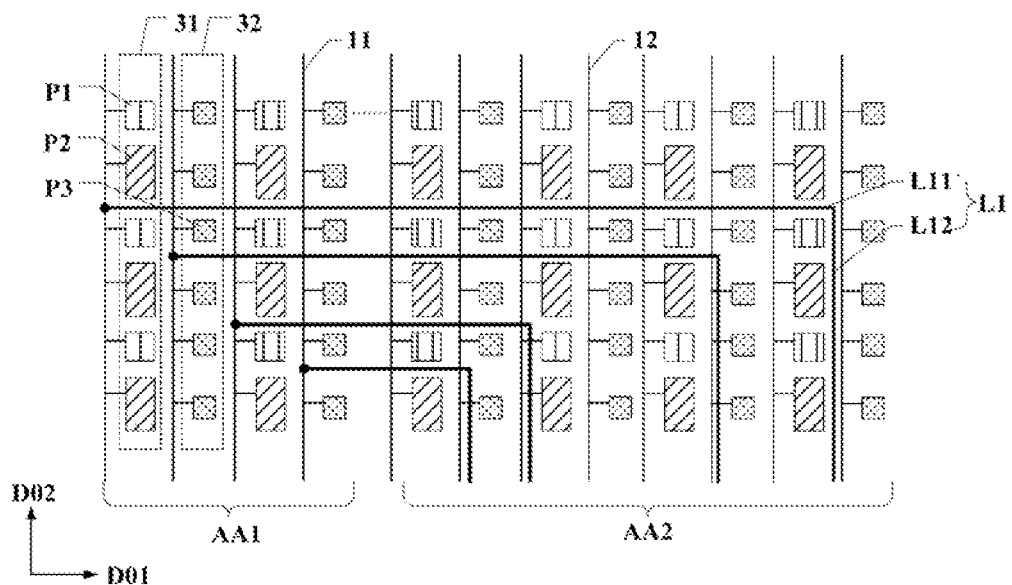
FIG. 15 is another exemplary connection between the sub-pixels and data lines according to various disclosed embodiments of the present disclosure.

It should be noted that, the embodiment shown in FIG. 14 shows a scheme in which four second connection line segments L12 are arranged between four adjacent pixel columns in the second display area AA2, but the actual positions of the second connection line segment L12 in the second display area AA2 is not limited. In some other embodiments of the present disclosure, the four second connection line segments L12 may also be disposed between non-adjacent pixel columns, for example, referring to FIG. 15 that is another connection relationship diagram of sub-pixels and data lines in one embodiment of the present disclosure.

Figure 16:
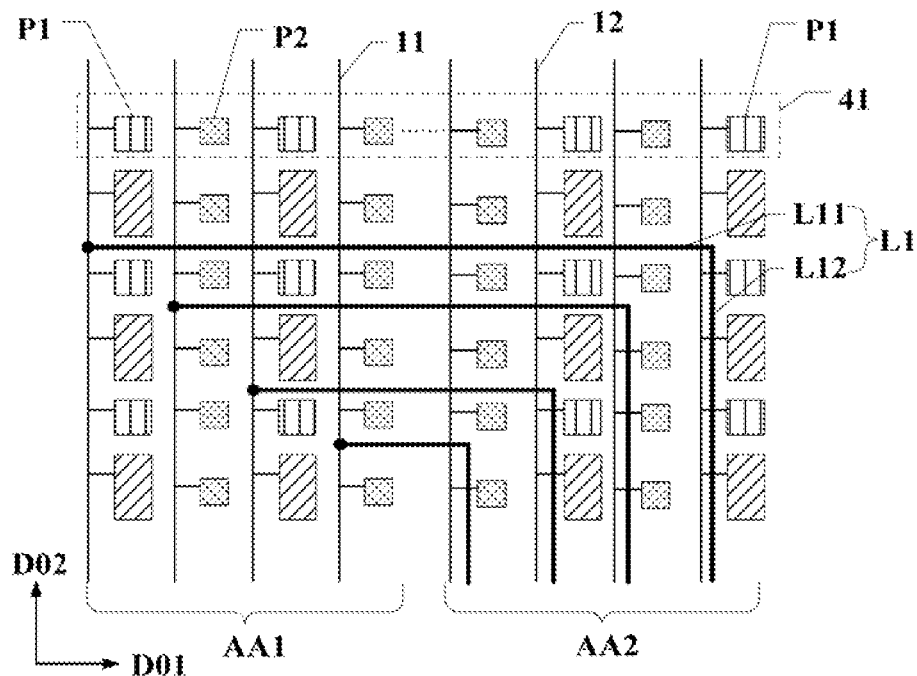
FIG. 16 is another exemplary connection between the sub-pixels and data lines according to various disclosed embodiments of the present disclosure.

FIG. 16 is another connection diagram of sub-pixels and data lines in one embodiment of the present disclosure. This embodiment only shows a kind of pixel arrangement of the display panel, and does not limit the actual pixel arrangement of the display panel.

As shown in FIG. 16, in one embodiment of the present disclosure, the display panel may further include a plurality of pixel rows 41. The pixel row 41 may include sub-pixels P1 of the first color and sub-pixels P2 of the second color arranged in the first direction D01. In a same pixel row 41, the sub-pixels connected to the first data line 11 connected to the second connection line segment L12 may be the sub-pixels P1 of the first color, and the sub-pixels connected to the first sub-data line 121 adjacent to the second connection line segment L12 may be the sub-pixels P1 of the first color. In another embodiment, in a same pixel row 41, the sub-pixels connected to the first data line 11 connected to the second connection line segment L12 may be the sub-pixels P2 of the second color; and the sub-pixels connected by the first sub-data lines 121 adjacent to the second connection line segments L12 may be the sub-pixel P2 of the second color.

Specifically, this embodiment shows that when the pixel row 41 includes the sub-pixel P1 of the first color and the sub-pixel P2 of the second color, in the same pixel row 41, the color of the sub-pixel connected to the first data line 11 connected by the second connection line segment L12 may be same as the color of the sub-pixel connected to the first sub-data line 121 adjacent to the second connection line segment L12, both of which may be connected to the sub-pixel P1 of the first color, or both may be connected to the sub-pixel P2 of the second color. The first data line 11 connected by the second connection line segment L12 and the first sub-data line 121 adjacent to the second connection line segment L12 may simultaneously charge two sub-pixels of the same color in the same pixel row 41. During the charging process, the voltage values of the signals transmitted on the first data line 11 and the first sub-data line 121 may be same or close to the same, which may more conducive to reducing or avoiding the occurrence of signal coupling or crosstalk between the first data line 11 and the second sub-data line 121 that have a short distance.

The embodiment shown in FIG. 16 shows the configuration that the first data line 11 connected to the second connection line segment L12 and the first sub-data line 121 adjacent to the second connection line segment L12 are connected to the sub-pixels of the same color in the same pixel row 41. In some other embodiments of the present disclosure, the colors of the sub-pixels connected to the two may also be different, for example, referring to FIG. 17 that is another connection diagram.

Figure 17:
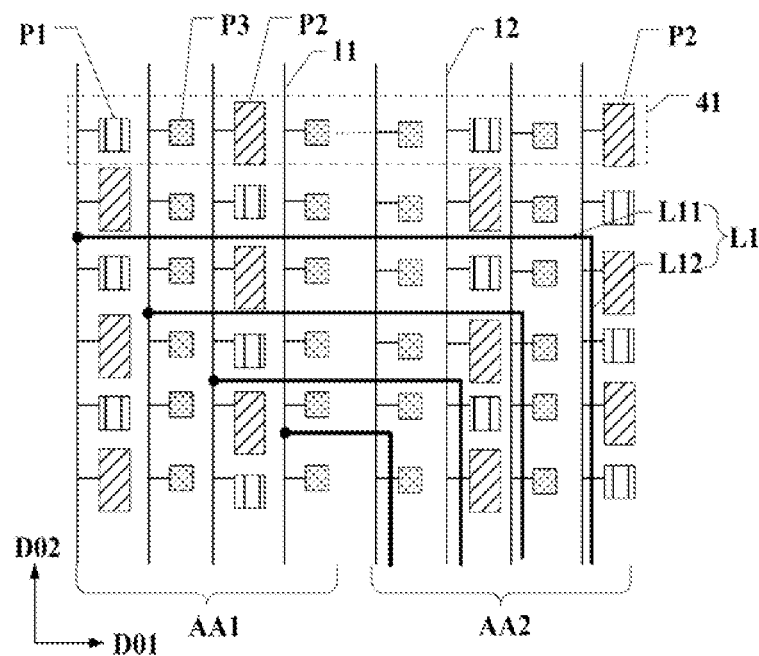
FIG. 17 is another exemplary connection between the sub-pixels and data lines according to various disclosed embodiments of the present disclosure.

As shown in FIG. 17, in one embodiment of the present disclosure, the display panel may further include a plurality of pixel rows 41. The pixel rows 41 may include sub-pixels P1 of the first color and sub-pixels of the second color P2 arranged in the first direction D01. In a same pixel row 41, the sub-pixel connected to the first data line 11 connected to the second connection line segment L12 may be the sub-pixel P1 of the first color, and the sub-pixel connected to the first sub-data line 121 adjacent to the second connection line segment L12 may be the sub-pixel P2 of the second color.

Specifically, the embodiment shown in FIG. 17 only shows the configuration that the first data line 11 connected to the second connection line segment L12 is connected to the sub-pixel P1 of the first color in one pixel row 41, and the first sub-data line 121 adjacent to the second connection line segment L12 is connected to sub-pixel P2 of the second color in the same pixel row 41, but the sub-pixels connected by the two may not be limited. In some other embodiments of the present disclosure, the first data line 11 connected by the second connection line segments L12 may also be connected to the sub-pixel P2 of the second color in a pixel row 41, and the first sub-data line 121 adjacent to the second connection line segment L12 may connected to the sub-pixel P1 of the first color in the same pixel row 41, as long as the colors of the sub-pixels connected by the two may be different.

In one embodiment, referring to FIG. 17, in addition to the sub-pixel P1 of the first color and the sub-pixel P2 of the second color, the pixel row 41 may also include the sub-pixel P3 of a third color. When the pixel row 41 includes the sub-pixel P3 of the third color, the first data line 11 connected by the second connection line segment L12 and the first sub-data line 121 adjacent to the second connection line segment L12 may be respectively connected to the sub-pixels of different colors, but the colors of the sub-pixels connected to them are not limited.

When the color of the sub-pixel connected to the first data line 11 connected to the second connection line segment L12 is different from the color of the sub-pixel connected to the first sub-data line 121 adjacent to the second connection line segment L12, because the first data line 11 and the first sub-data line 121 may charge the connected sub-pixels at the same time, and the signals transmitted by the first data line 11 and the first sub-data line 121 may be data signals for charging the sub-pixels, it may be beneficial to reduce the problem of signal coupling or crosstalk occurring between the second connection line segment L12 and its adjacent first sub-data line 121; and it may also be beneficial to improving the display accuracy of the display panel.

Figure 18:
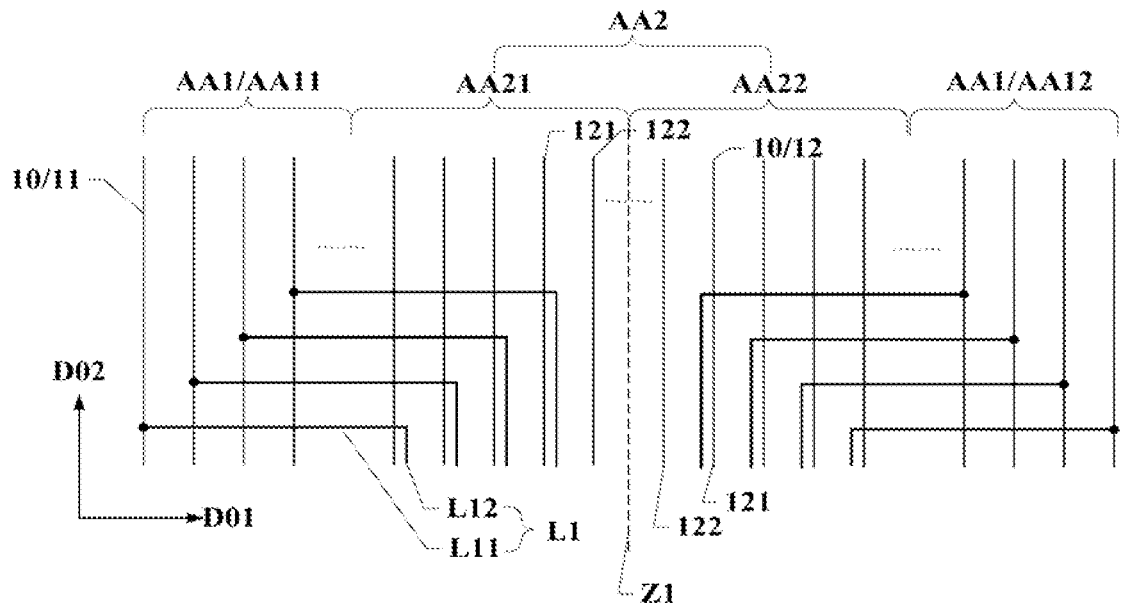
FIG. 18 is an exemplary layout of first connection wirings and data lines.

FIG. 18 is a schematic diagram of the arrangement of the first connection line L1 and the data line. To clearly reflect the relative positional relationship between the second connection line segment L12 and the first sub-data line 121 and the second sub-data line 122, FIG. 18 does not show the pixel arrangement structure and demultiplexing unit in the display panel.

As shown in FIG. 18, in one embodiment of the present disclosure, in the first sub-data line 121 adjacent to a second connection line segment L12 and the second sub-data line 122, in the first direction D01, the first sub-data line 121 may be located between the second sub-data line 122 and the first display area AA1. The first display area AA1 may be a first display area AA1 where the first data line 11 connected to the aforementioned second connection line segment L12 is located.

In one embodiment of the present disclosure, in the second display area AA2, the second connection line segment L12 may be located between the first sub-data line 121 and the second sub-data line 122. The data line closer to the second connection line segment L12 may be the first sub-data line 121, and the data line farther away from the second connection line segment L12 may be the second sub-data line 122. It should be noted that the first sub-data line 121 and the second sub-data line 122 are named only based on the distance between the two sub-data line and the second connection line segment L12. For the same second data line 12, it may be the first sub-data line 121 corresponding to a second connection line segment L12, or another second sub-data line 121 corresponding to the second connection line segment L12.

In one embodiment, it may be assumed that the display panel may include a first display area AA11 located at the left side of the second display area AA2 and a first display area AA12 located at the right side of the second display area AA2. Among the second connection line segment L12 connected by the data line 11 in the first display area AA11, in the first direction D01, the second connection line segment L12 may be relatively close to the second data line 12 at its left side, and the second connection line segment L12 may be relatively further to the second data line 12 at its right side. The second data line 12 located at the left side of the second connection line segment L12 and adjacent to it may be the first sub-data line 121, and the second data line 12 located at the right side of the second connection line segment L12 and adjacent to it may be the second sub-data line 122. At this time, the first sub-data line 121 may be located between the second sub-data line 122 and the first display area AA11, and the first display area AA11 may be the display area where the first data line 11 connected to the aforementioned second connection line segment L12 is located.

In the second connection line segment L12 connected to the second data line 12 in the first display area AA12, in the first direction D01, the second connection line segment L12 may be relatively close to the second data line 12 at its right side, and may be relatively farther away from the second data line 12 at the left side. The second data line 12 at the right side of the second connection line segment L12 and adjacent to it may be the first sub-data line 121, and the second data line 12 at the left of the second connection line segment and adjacent to it may be the second sub-data line 122. At this time, the first sub-data line 121 may be located between the second sub-data line 122 and the first display area AA12, and the first display area AA12 may be the display area where the first data line 11 connected to the aforementioned second connection line segment L12 is located.

This embodiment shows the configuration that the first sub-data lines 121 corresponding to the second connection line segment L12 connected to the first data line 11 in the first display area AA11 may all be arranged at the left side of the corresponding second connection line segment L12, and the first sub-data lines 121 corresponding to the second connection line segment L12 connected to the first data line 11 in the first display area AA12 may all be arranged on the right side of the corresponding second connection line segment L12. In such a configuration, in the second display area AA2, a unified standard may be adopted to arrange the second connection line segment L12 connected to the first sub-data line 11 in the first display area AA1 at the same side, and the wiring complexity of the second connection line segment L12 may be reduced.

Figure 19:
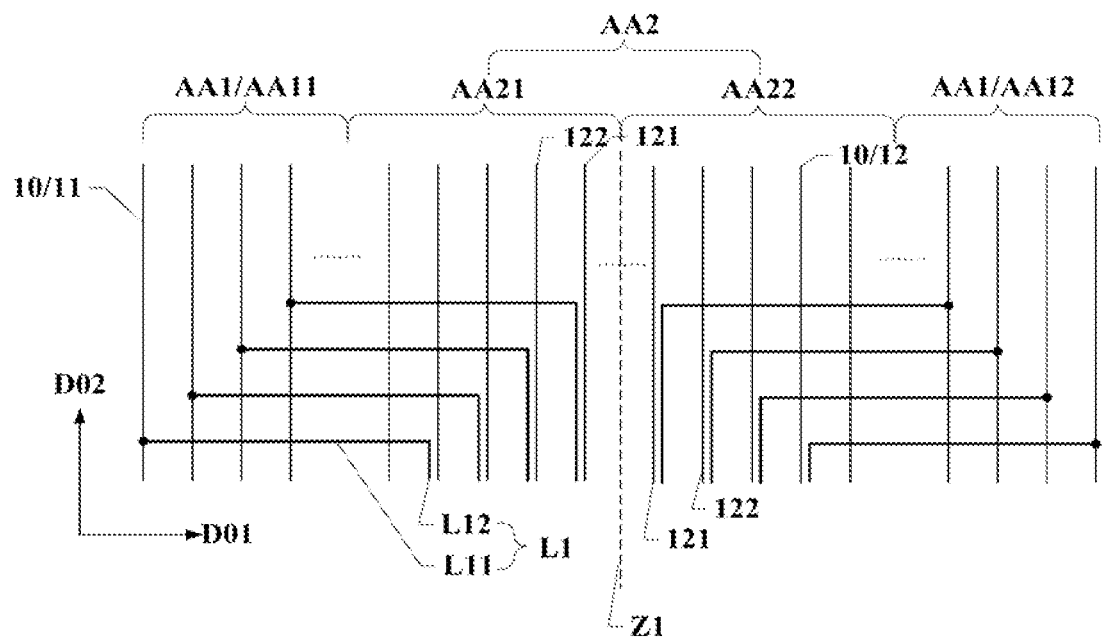
FIG. 19 is another exemplary layout of first connection wirings and data lines.

FIG. 19 shows another schematic diagram of the arrangement of the first connection line L1 and the data line. To clearly reflect the relative positional relationship between the second connection line segment L12 and the first sub-data line 121 and the second sub-data line 122, FIG. 19 does not show the pixel arrangement structure and demultiplexing unit in the display panel.

As shown in FIG. 19, in one embodiment of the present disclosure, in the first sub-data line 121 and the second sub-data line 122 adjacent to the second connection line segment L12, in the first direction D01, the second sub-data line 122 may be located between the first sub-data line 121 and the first display area AA1. The first display area AA1 may be the display area where the first data line 11 connected to the aforementioned second connection line segment L12 is located.

In one embodiment, it is assumed that the display panel may include a first display area AA11 located at the left side of the second display area AA2 and a first display area AA12 located at the right side of the second display area AA2. In the second connection line segment L12 connected by the first data line 11 in the first display area AA11, in the first direction D01, the second connection line segment L12 may be relatively close to the second data line 12 at its right side, and the second connection line segment L12 may be relatively further away from the second data line 12 at its left side. The second data line 12 located at the right side of the second connection line segment L12 and adjacent to it may be the first sub-data line 121, and the second data line 12 located at the left side of the second connection line segment L12 and adjacent to it may be the second sub-data line 122. At this time, the second sub-data line 122 may be located between the first sub-data line 121 and the first display area AA11. The first display area may be a display area where the first data line 11 connected by the second connection line segment L12 is located.

In the second connection line segment L12 connected to the second data line 12 in the first display area AA12, in the first direction D01, the second connection line segment L12 may be relatively close to the second data line 12 at its left side, and may be further away from the second data line 12 at the right side. The second data line 12 at the left side of the second connection line segment L12 and adjacent to it may be the first sub-data line 121. The second data line 12 at the right side of the second connection line segment L12 and adjacent to it may be the second sub-data line 122. At this time, the second sub-data line 122 may be located between the first sub-data line 121 and the first display area AA12, and the first display area AA12 may be the display area where the first data line 11 connected to the aforementioned second connection line segment L12 is located.

This embodiment shows the scheme that the first sub-data lines 121 corresponding to the second connection line segment L12 connected to the first data line 11 in the first display area AA11 may be arranged at the right side of the second connection line segment L12, and the first sub-data lines 121 corresponding to the second connection line segment L12 connected to the first data line 11 in the first display area AA12 may be arranged at the left side of the second connection line segment L12. Thus, in such a configuration, in the second display area AA2, the second connection line segment L12 connected to the first data line 11 in the first display area AA1 at the same side may be arranged according to a unified standard to simplify the wiring complexity of the second connecting line segment L12.

Further, referring to FIG. 18 and FIG. 19, in one embodiment of the present disclosure, in the first direction D01, the first display area AA1 may be located at both sides of the second display area AA2. The second display area AA2 may include the first sub-display area AA21 and the second sub-display area AA22 arranged in the first direction D01. The second connecting line segments L12 in the first sub-display area AA21 and the second sub-display area AA22 may be symmetrically arranged along a first symmetry axis Z1. The first symmetry axis Z1 may extend in the second direction D02 and may be located between the first sub-display area AA21 and the second sub-display area AA22.

Specifically, when the first data line 11 in the first display area AA11 is connected to the second connection line segment L12 in the second display area AA2, the corresponding second connection line segment L12 may be located in the first sub-display area AA21 in the second display area AA2. When the first data line 11 in the first display area AA12 is connected with the second connection line segment L12 in the second display area AA2, the corresponding second connection line segment L12 may be located in the second sub-display area AA22 of the second display area AA2. The second connection line segments L12 in the first sub-display area AA21 and the second sub-display area AA22 may be symmetrical, and the symmetrical arrangement may be beneficial to simplify the layout process of the second connecting line segments L12.

In one embodiment of the present disclosure, in the first sub-data line 121 and the second sub-data line 122 adjacent to a second connection line segment L12 in the first sub-display area AA21 and the second sub-display area AA22, the first sub-data line 121 may be located at the side of the second connection line segment L12 away from the first symmetry axis Z1, as shown in FIG. 18. In another embodiment, the first sub-data line 121 may be located at the side of the second connection line segment L12 adjacent to the first symmetry axis Z1.

When arranging the second connection line segment L12 in the first sub-display area AA21 and the second sub-display area AA22 in a symmetrical manner in the first symmetry axis Z1, the first symmetry axis Z1 may be used as a reference to dispose the first sub-data line 121 corresponding to the second line segment L12 may be uniformly arranged at the side of the second connection line segment L12 away from the first symmetry axis Z1 or at the side adjacent to the symmetry axis Z1, thereby facilitating the simplification of the layout process of the second connection line segment L12 in the first sub-display area AA21 and the second sub-display area AA22.

Figure 20:
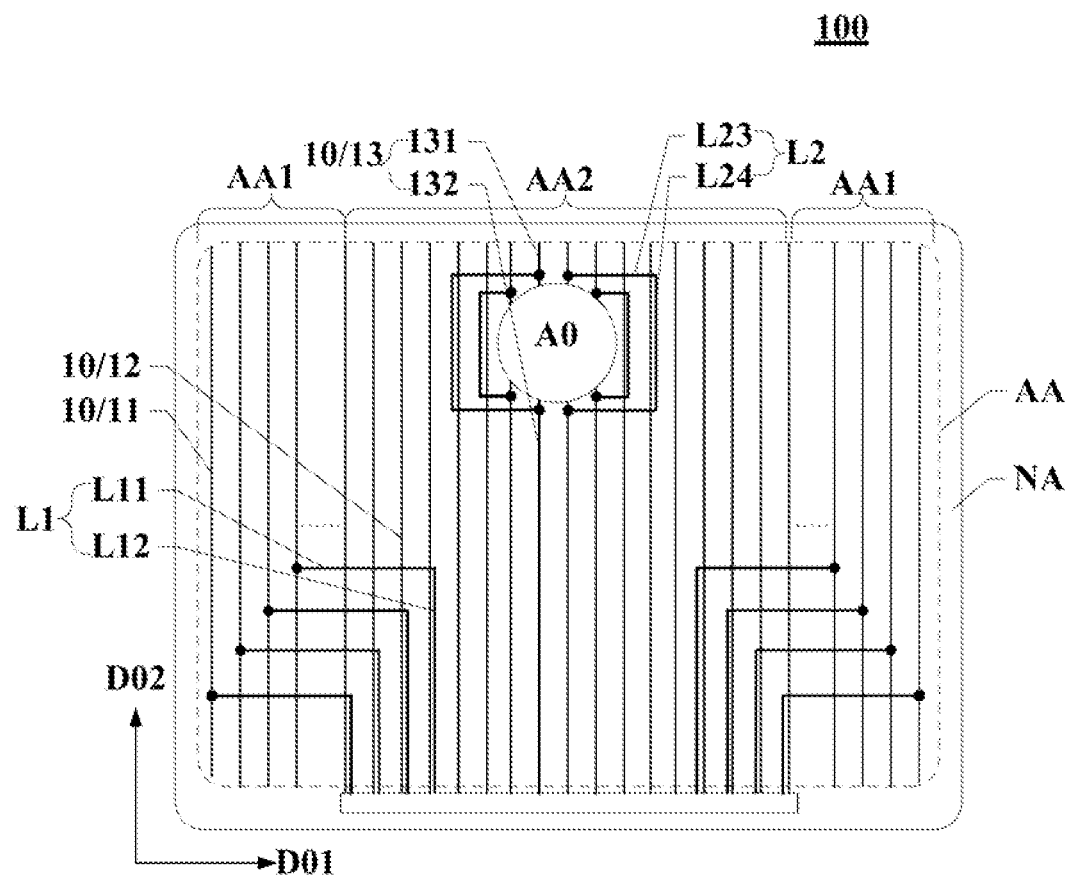
FIG. 20 illustrates a top view of another exemplary display panel according to various disclosed embodiments of the present disclosure.

FIG. 20 is a top view of an exemplary display panel according to various disclosed embodiments of the present disclosure. As shown in FIG. 20, the display panel may further include an optical device area A0. It should be noted that FIG. 20 only shows one position of the optical device area A0 in the display panel, and does not limit the actual position of the optical device area A0. The optical device area A0 with a circle shape is described as an example, and the actual shape of the optical device area A0 is not limited. In some other embodiments, the optical device area A0 may also be embodied in other shapes, such as square, ellipse and so on.

As shown in FIG. 20, in one embodiment, the display panel may further include an optical device area A0, and the display area AA may surround the optical device area A0. The data line 10 may further include a third data line 13, and the third data line 13 may be separated by the optical device area A0 to form a first line segment 131 and a second line segment 132.

The display panel may further include a plurality of second connection lines L2. The second connection lines L2 may include a third connection line segment L23 and a fourth connection line segment L24. The third connection line segment L23 may extend in the first direction D01, and the fourth connection line segment L24 may extend in the second direction D02. The first line segment 131 and the second line segment 132 may be respectively electrically connected to a same fourth connection line segment L24 through different third connection line segments L23. At least one fourth connection line segment L24 and at least one third connection line segment L23 may be located in the display area AA; and the fourth connection line segment L24 may be disposed on a same layer as the third data line 13.

Specifically, when the optical device area A0 is introduced into the display panel, in one embodiment, the optical device area A0 may be surrounded by the display area AA. When the optical device area A0 is introduced into the display panel, the third data line 13 may be broken by the optical device area A0 to form a first line segment 131 and a second line segment 132. The first line segment 131 and the second line segment 132 may be connected through a second wiring L2. For example, the first line segment 131 and the second line segment 132 may be respectively electrically connected to the same fourth connection line segment L24 through different third connection line segments L23, and the fourth connection line segment L24 may be connected to the third data line 13. The extending directions of the fourth connection line segment 24 and the third data line 13 may be same, and they may be arranged on the same layer as the third data line 13. The first line segment 131 and the second line segment 132 in the third data line 13 may be electrically connected through the second connection line L2, and the second connection line L2 may not need to be disposed at the frame position of the optical device area A0, which may facilitate the realization of a narrow frame design of the light-emitting device area. Further, setting the fourth connection line segment L24 and the third data line 13 on the same layer does not need to introduce a new film layer for the fourth connection line segment L24, which may be beneficial to simplify the overall film layer structure of the display panel.

It should be noted that FIG. 20 only shows the scheme that there are four third data lines 13 broken by the optical device area A0, but it does not represent the actual number of the third data lines 13 broken by the optical device area A0. In some other embodiments, the number of the third data lines 13 broken by the optical device area A0 may be more than four.

Figure 21:
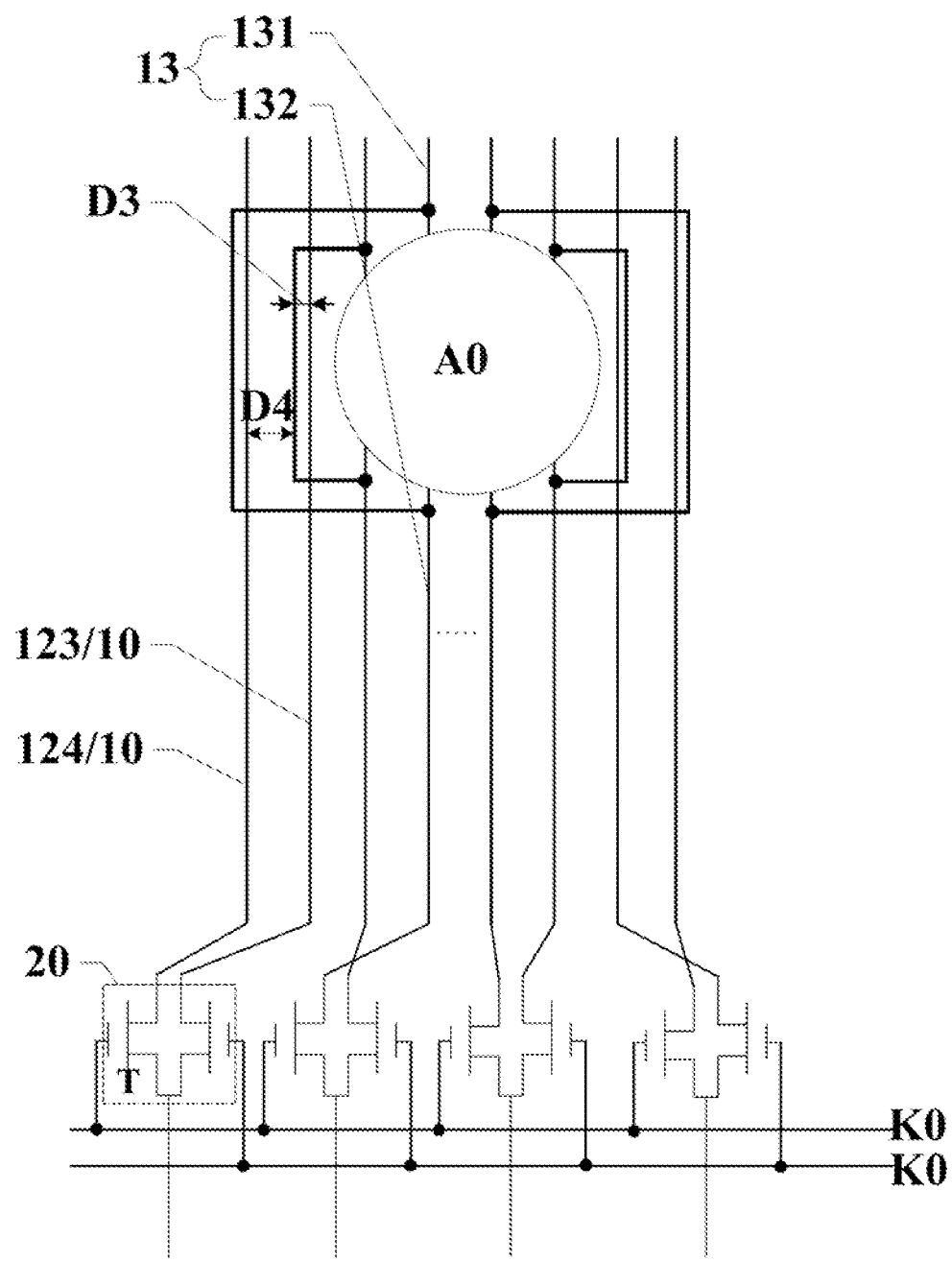
FIG. 21 is an exemplary connection of demultiplexing units corresponding to first connection wirings and second connection wirings in a peripheral region of a light-emitting device area according to various disclosed embodiments of the present disclosure.

FIG. 21 is a schematic diagram of connection of the third data line 13, the second connection line segment L12 and the demultiplexing unit 20 in the peripheral area of the light-emitting device area.

As shown in FIG. 21, in one embodiment of the present disclosure, in the display area, the fourth connection line segment L24 may be located between two adjacent data lines 10, and the adjacent two data lines 10 may be respectively the third sub-data line 123 and the fourth sub-data line 124. In the first direction D01, the distance between the fourth connection line segment L24 and the third sub-data line 123 may be D3, the distance between the fourth connection line segment L24 and the fourth sub-data line 124 may be D4, and D3<D4.

The control terminal of the switch element T corresponding to the third data line 13 connected to the fourth connection line segment L24 and the control terminal of the switch element T corresponding to the third sub-data line 123 may be connected to the same switch control line K0. The control terminal of the switch element T corresponding to the third data line 13 connected to the fourth connection line segment L24 and the control terminal of the switch element T corresponding to the fourth sub-data line 124 may be connected to different switching control lines K0.

Specifically, when the first line segment 131 and the second line segment 132 in the third data line 13 may be electrically connected through the third connection line segment L23 and the fourth connection line segment L24, the fourth connection line segment L24 may be located between the two data lines 10 at one or both sides of the optical device area A0 in the first direction D01, and the two data lines 10 adjacent to the fourth connection line segment L24 may be respectively the third sub-data line 123 and the fourth sub-data line 124. The fourth connection line segment L24 may be relatively close to the third sub-data line 123, and the fourth connection line segment L24 may be relatively further away from the fourth sub-data line 124. The distance D3 between the fourth connection line segment L24 and the third sub-data line 123 may refer to the width of the interval between the fourth connection line segment L24 and the third sub-data line 123 in the first direction D01. The distance D4 between the fourth connection line segment and the fourth sub-data line 124 may refer to the width of the interval between the fourth connection line segment L24 and the fourth sub-data line 124 in the first direction D01.

The third sub-data line 123 and the third sub-data line 123 and the fourth sub-data line 124 adjacent to the third data line 13 and the fourth connection line segment L24 may be respectively connected to different switch elements T. In one embodiment, the control terminal of the switch element T connected to the third data line 13 connected to the fourth connection line segment L24 and the control terminal of the switch element T connected to the third sub-data line 123 adjacent to the fourth connection line segment L24 may be connected to the same switch control line K0. In such a configuration, the simultaneous charging of the third data line 13 connected to the fourth connection line segment L24 and the third sub-data line 123 that is closer to the fourth connection line segment L24 may be realized, thus effectively reducing or avoiding the signal coupling or crosstalk occurs between the connection line segment L24 and the third sub-data line 123. Further, because the fourth connection line segment L24 may be relatively further away from the fourth sub-data line 124, even if the two are not charged at the same time, the probability of signal coupling or crosstalk may be relatively low, which may be conducive to improve the accuracy and stability of the signal transmitted by the data line and the overall display effect of the display panel may be enhanced.

In one embodiment, 2 μm≤D3≤3 μm. When the distance between the fourth connection line segment L24 and the third sub-data line 123 arranged on the same layer is too small, for example, less than 2 μm, it may increase the difficulty of forming the fourth connection line segment L24 and the third sub-data line 123, and it may also increase the risk of short circuit between the fourth connection line segment L24 and the third sub-data line 123. Considering that the distance between the third sub-data line 123 and the fourth sub-data line 124 adjacent to the fourth connection line segment L24 is constant, if the distance between the fourth connection line segment L24 and the fourth sub-data line 124 is relatively large, for example, when it is greater than 3 μm, the distance between the fourth connection line segment L24 and the fourth sub-data line 124 may be relatively small. Considering that the fourth connection line segment L24 and the fourth sub-data line 124 may be connected to different switch control lines K0, the two may not be charged at the same time, if the distance is too small, the risk of signal coupling between the two may increase, affecting the display accuracy of the display panel. Therefore, in one embodiment of the present disclosure, when the distance between the fourth connection line segment L24 and the third sub-data line 123 adjacent to it is set to be 2 μm≤D1≤3 μm, it may ensure that there may be a certain interval between the fourth connection line segment L24 and the third sub-data line 123 adjacent to it, avoiding the problem of short circuit between the two, simplifying the difficulty of making the fourth connection line segment L24 and the third sub-data line 123, and ensuring that the distance between the fourth connection line segment L24 and the fourth sub-data line 124 adjacent to it may be relatively large, which may reduce the probability of signal coupling between the fourth connection line segment L24 and its adjacent fourth sub-data lines 124.

In one embodiment, in the first direction D01, the distance D4 between the fourth connection line segment L24 and its adjacent fourth sub-data line 124 may be same as the distance between the fourth connection line segment L24 and its adjacent third sub-data line 123 may satisfy the relationship of D4/D3≥15, which may be beneficial to ensure that the distance between the fourth connection line segment L24 and the fourth sub-data line 124 may be large enough to reduce the probability of signal crosstalk between the fourth connection line segment L24 and the fourth sub-data line 124. In one embodiment, depending on the pixel density of the product, the distance D2 between the fourth connection line segment L24 and the adjacent fourth sub-data line 124 may be about tens of microns, for example, about 50 microns, or about 60 microns, etc.

Figure 22:
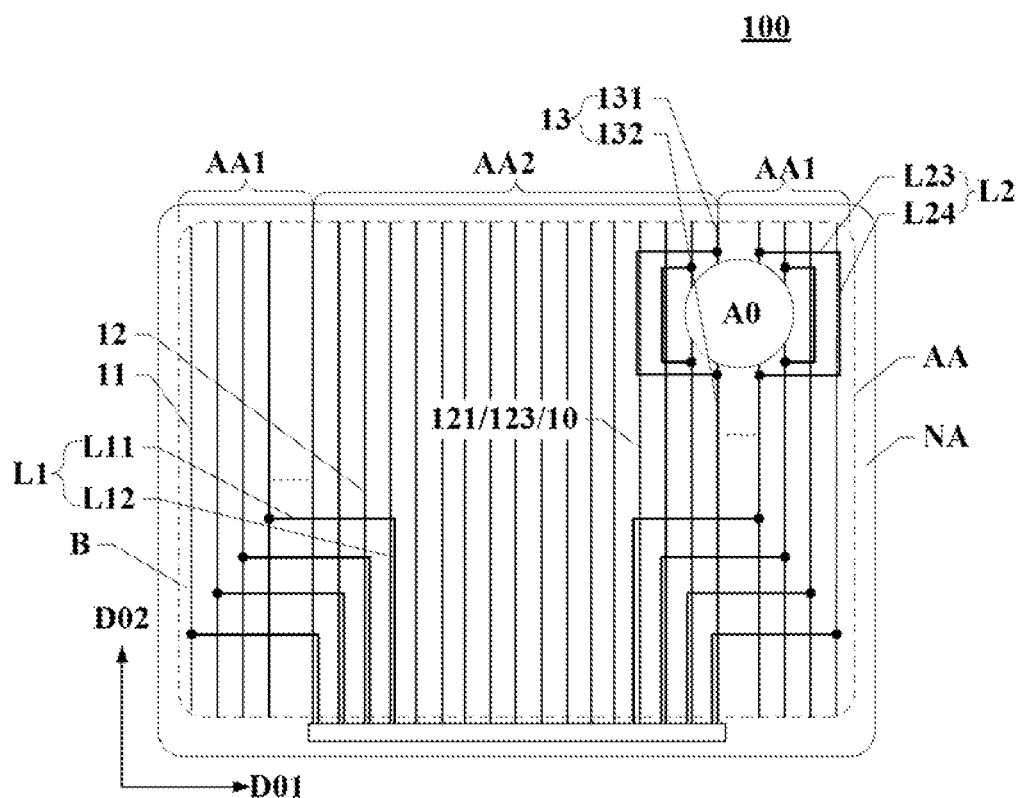
FIG. 22 illustrates a top view of another exemplary display panel according to various disclosed embodiments of the present disclosure.
Figure 23:
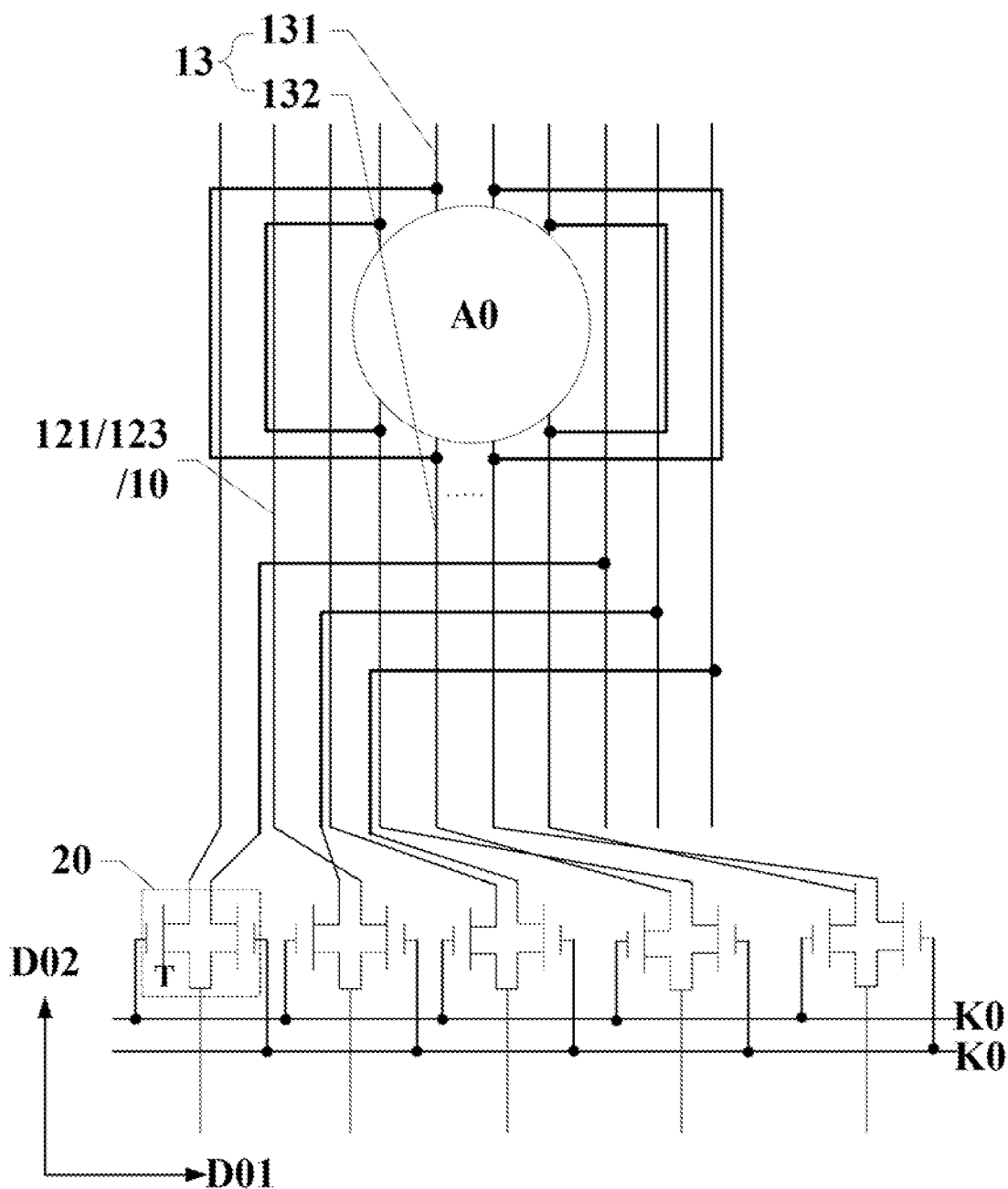
FIG. 23 is an exemplary connection of demultiplexing units corresponding to first connection wirings and second connection wirings according to various disclosed embodiments of the present disclosure.

FIG. 22 is a top view of an exemplary display panel according to various disclosed embodiments of the present disclosure. This embodiment shows another possible position of the optical device area A0 in the display panel. FIG. 23 is a schematic diagram showing a connection between the data lines corresponding to the first connection line L1 and the second connection line L2 and the demultiplexing unit 20.

As shown in FIG. 22 and FIG. 23, in one embodiment of the present disclosure, the first sub-data line 121 adjacent to a second connection line segment L12, and the third sub-data line 123 adjacent to a fourth connection line segment L24 may be a same data line. The control terminal of the switch element T corresponding to the first data line 11 connected to the second connection line segment L12 and the control terminal of the switch element T corresponding to the third data line 13 connected to the fourth connection line segment L24 may be connected to a same switch control line K0.

This embodiment shows a scheme in which a portion of the optical device area A0 is surrounded by the second display area AA2, and another portion of the optical device area A0 is surrounded by the first display area AA1. A portion of the third data line 13 may be located in the second display area AA2, and a portion of the third data line 13 may be located in the first display area AA1. In the second display area AA2, the fourth connection line segment L24 connected to the third data line 13 and the second connection line segment L12 connected to the first data line 11 may be both adjacent to the same data line 10. The fourth connection line segment L24 adjacent to the third sub-data line 123 and the first sub-data line 121 adjacent to the second connection line segment L12 may be embodied as a same first data line 10. The switch element T connected to the data line 10, the third data line 13 connected to the fourth connection line segment L24 and the third data line 13 connected to the fourth connection line segment L24 and the first data line 11 connected by the second connection line segment L12 may be connected to a same switch control line K0. Thus, it may be equivalent to realizing simultaneous charging of the fourth connection line segment L24 and the second connection line segment L12 and the data line 10 that are relatively close to each other. Accordingly, the probability of any two of the fourth connection line segment L24 and the second connection line segment L12 and the data line 10 having signal coupling or crosstalk problems due to the different transmitted signals may be reduced. Thus, it may be also conducive to improving accuracy of the signal transmitted by the data line; and the overall display reliability of the display panel may be improved.

Figure 24:
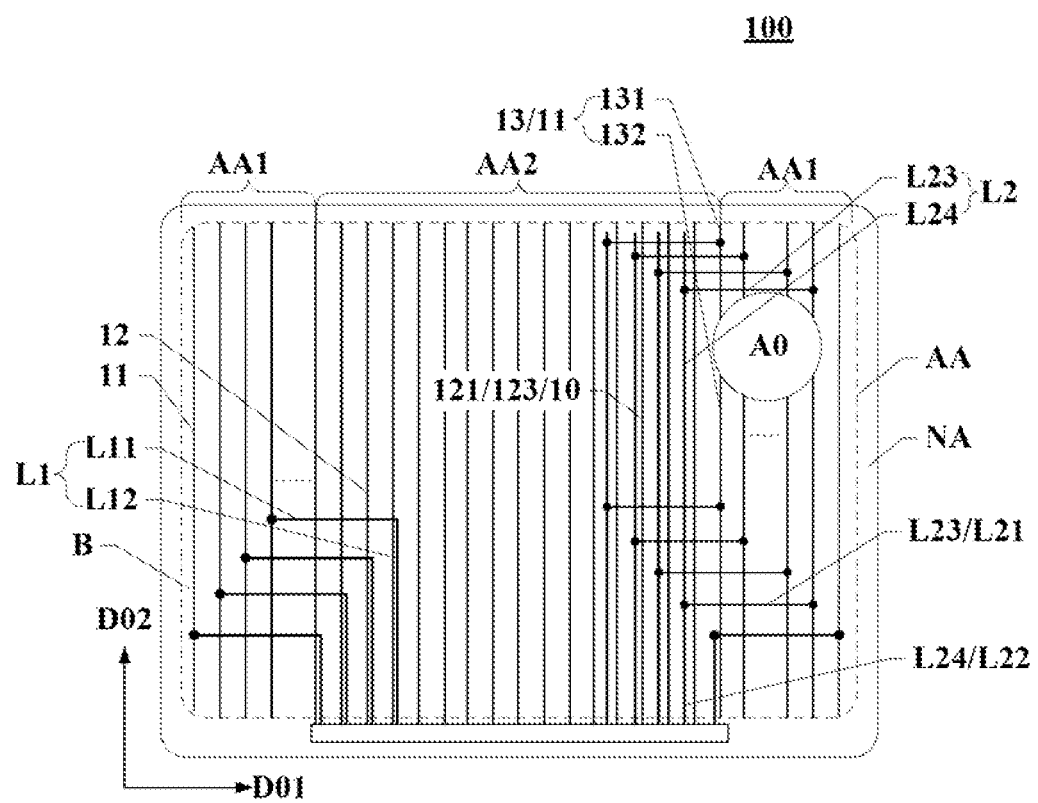
FIG. 24 illustrates a top view of another exemplary display panel according to various disclosed embodiments of the present disclosure.

It should be noted that, in the embodiment shown in FIG. 22, the fourth connection line segment L24 in the second connection line L2 and the second connection line segment L22 in the first connection line L1 may be two independent line segments. In some other embodiments of the present disclosure, if the third data line 13 is located in the first display area AA1, the third data line 13 may also be represented as the first data line 11 at the same time, which may be equivalent to that a portion of the first data line 11 is cut off by the optical device area A0, and the first data line 11 cut off by the optical device area A0 may be embodied as a third data line 13. Referring to FIG. 24 which shows a top view of another exemplary display panel according to various disclosed embodiments and shows another possible position of the optical device area A0 in the display panel. In the embodiment shown in FIG. 24, when the third data line 13 is embodied as the first data line 11, the fourth connection line segment L24 and the second connection line segment L22 corresponding to the third data line 13 may be a same line segment, and the third connection line segment L23 located at the bottom of the optical device area A0 and the first connection line segment L21 may a same line segment. Such a wiring method may reduce the number of line segments connected to the third data line 13, which may be beneficial to simplify the wiring complexity of the display panel. The connection relationship between the data line and the duplexing unit in the embodiment shown in FIG. 24 may be referred to the foregoing embodiments, and will not be repeated here.

Figure 25:
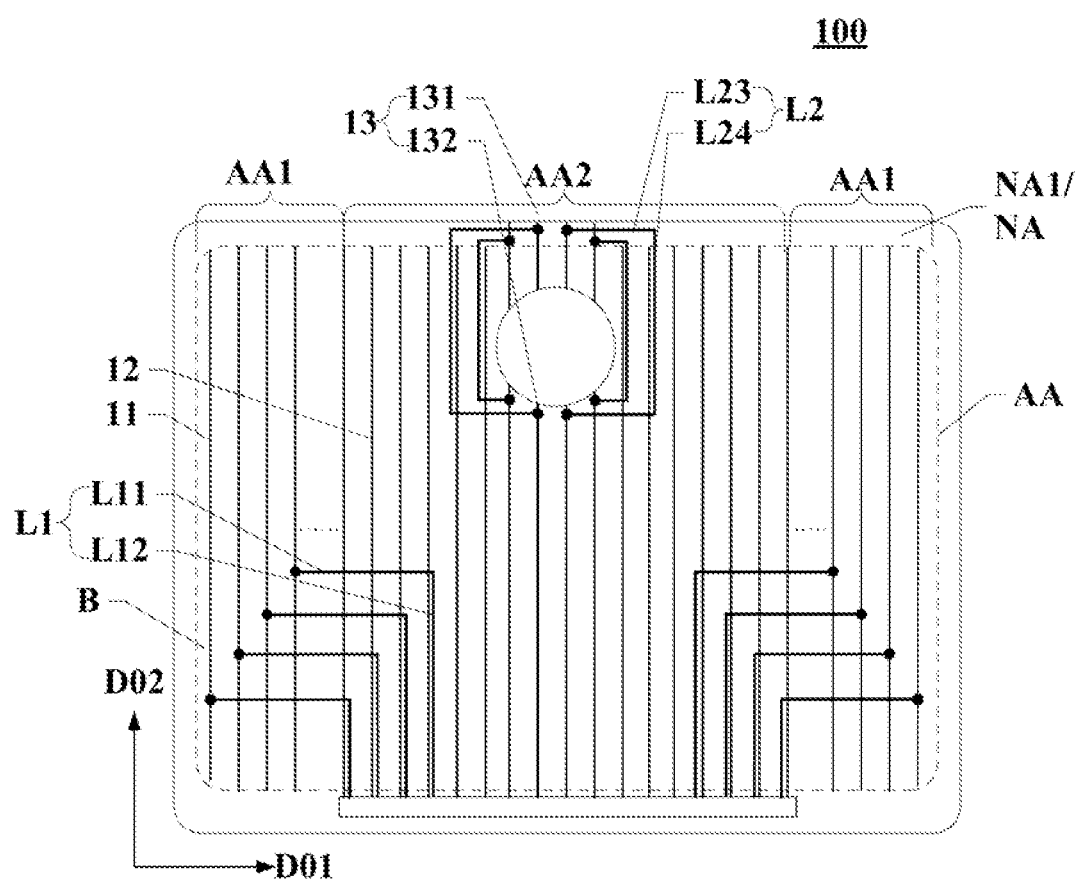
FIG. 25 illustrates a top view of another exemplary display panel according to various disclosed embodiments of the present disclosure.

FIG. 25 is a top view of another exemplary display panel provided according to various disclosed embodiments of the present disclosure. This embodiment shows the solution that a portion of the third connection line segment L23 in the second connection line L2 is arranged in the frame area of the display panel.

As shown in FIG. 25, in one embodiment of the present disclosure, the display panel may further include a non-display area NA at least partially surrounding the display area, the non-display area NA may include a first non-display area NA1, and at least a portion of the third connection line segment L23 may be located in the first non-display area NA1. The aforementioned first non-display area NA1 may be regarded as the upper frame area of the display panel.

When the second connection line L2 is introduced to realize the electrical connection between the first line segment 131 and the second line segment 132 in the third data line 13, the third connection line segment L23 in the third data line 13 may extend in the first direction D01. If all the third connection line segments L23 are arranged in the display area AA, the third connection line segments L23 may occupy the space of the display area of the display panel and affect the screen-to-body ratio of the display panel. When a portion of the third connection line segment L23 is set in the first non-display area NA1, this portion of the third connection line segment L23 may no longer occupy the space of the display area AA, thereby reducing the number of the third connection line segments L23 introduced in the display area. Therefore, it may be beneficial to increase the aperture ratio of the display panel. It should be noted that this embodiment only shows the scheme of setting all the third connection line segments L23 above the optical device area A0 in the first non-display area NA1. In some other embodiments of the present disclosure, it may also be possible to dispose a portion of the third connection line segments L23 located above the optical device area A0 in the first non-display area NA1, which is not specifically limited in the present disclosure.

Figure 26:
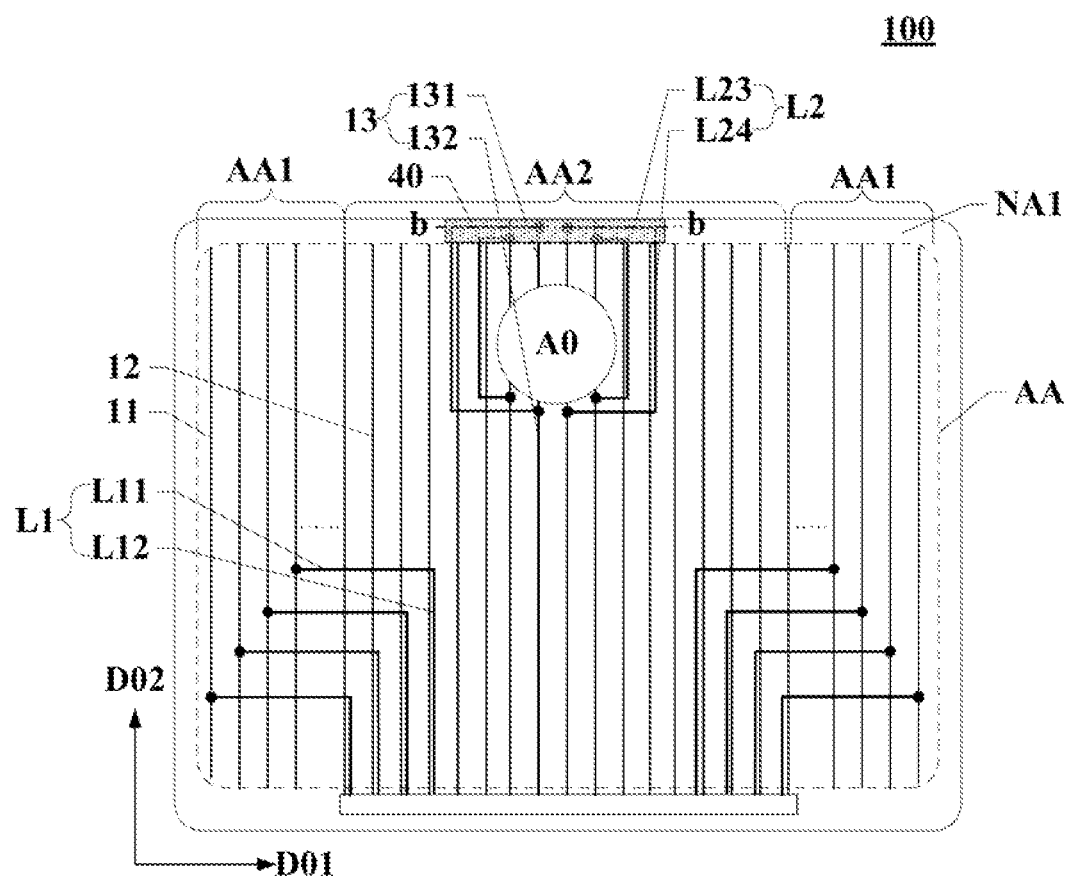
FIG. 26 illustrates a top view of another exemplary display panel according to various disclosed embodiments of the present disclosure.
Figure 27:
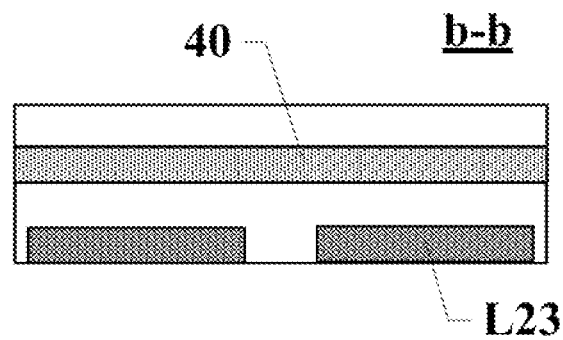
FIG. 27 is a bb-sectional view in FIG. 26.

FIG. 26 is a top view of another exemplary display panel according to various disclosed embodiments of the present disclosure. FIG. 27 is a bb-sectional view in FIG. 26. This embodiment illustrates a solution that a signal shielding layer 40 may be introduced in the first non-display area NA1.

As shown in FIG. 26 and FIG. 27, in one embodiment of the present disclosure, the display panel may further include a signal shielding layer 40 disposed in the first non-display area NA1. In the first non-display area NA1, the orthographic projection of L23 of the third connection line segment L23 onto the light-exiting surface of the display panel may overlap with the orthographic projection of the signal shielding layer 40 on the light-emitting surface of the display panel. The signal shielding layer 40 may receive a fixed potential. In another embodiment, in the first non-display area NA1, the orthographic projection of the third connection line segments L23 onto the light-exiting surface of the display panel may all be within the range of the orthographic projection of the signal shielding layer 40 onto the light-exiting surface of the display panel. In the first non-display area NA1, the problem of signal coupling may occur between two adjacent third connection line segments L23. When a signal shielding layer 40 receiving a fixed potential is introduced in the first non-display area NA1, the signal shielding layer 40 may reduce or avoid the problem of coupling between two adjacent third connection line segments L23, thereby improving the accuracy and stability of signals transmitted on the data lines.

Referring to FIG. 1 and FIG. 18, in one embodiment of the present disclosure, the display panel may include a substrate 00, and a first metal layer M1, a capacitor metal layer MC, a second metal layer M2 and a third metal layer M3 disposed on one side of the substrate 00. In the thickness direction of the display panel, the capacitance metal layer MC may be located on the side of the first metal layer M1 away from the substrate 00; the second metal layer M2 may be located on the side of the capacitance metal layer MC away from the substrate 00; the third metal layer M3 may be located on the side of the second metal layer M2 away from the substrate 00.

Further, referring to FIG. 1 and FIG. 18, the data line 10 and the second connection line segment L12 may be located on the second metal layer M2, and the first connection line segment L11 may be located on at least one of the first metal layer M1, the capacitor metal layer MC, and the third metal layer M3. In some embodiments, the data line 10 and the second connection line segment L12 may be located in the third metal layer M3, and the first connection line segment L11 may be located on at least one of the first metal layer M1, the capacitor metal layer MC, and the second metal layer M2.

When the second connection line segment L12 and the data line 10 are arranged on the second metal layer M2, and the first connection line segment L11 is arranged on at least one of the first metal layer M1, the capacitor metal layer MC and the third metal layer M3, the existing film layer of the display panel may be used to set the second connection line segment L12 and the first connection line segment L11, there may be no need to add a new film layer in the display panel to set the first connection line segment L11 and the second connection line segment L12. Thus, it may be beneficial to simplify the film layer structure of the display panel, reduce the number of masks in the display panel manufacturing process, and may also help to reduce production costs.

Similarly, when the second connection line segment L12 and the data line 10 are arranged on the third metal layer M3, and the first connection line segment L11 is arranged on at least one of the first metal layer M1, the capacitor metal layer MC and the second metal layer M2, the second connection line segment L12 and the first connection line segment L11 may be disposed on the existing film layer of the display panel, and it may not be necessary to add a new film layer in the display panel to dispose the first connection line segment L11 and the second connection line segment L12. Therefore, it may be also beneficial to simplify the film layer structure of the display panel and reduce the number of masks in the display panel manufacturing process, and may also be beneficial to reduce production costs.

In one embodiment, when the display panel includes the optical device area A0 as shown in FIGS. 20-27, the introduced fourth connection line segment L24 may be disposed on the same layer as the data line 10, and may be disposed on the second metal layer M2 or the third metal layer M3, the third connection line segment L23 and the fourth connection line segment L24 may be arranged on different film layers. When the fourth connection line segment L24 is located on the second metal layer M2, the third connection line segment L23 may be located on one of the first metal layer M1, the capacitor metal layer MC, the second metal layer M2 and the third metal layer M3. When the fourth connection line segment L24 is located on the third metal layer M3, the third connection line segment L23 may be disposed on one of the first metal layer M1, the capacitor metal layer MC and the second metal layer MC layer. In such a configuration, when the third connection line segment L23 and the fourth connection line segment L24 are introduced into the display panel, there may also be no need to add a new film layer to the display panel, and the existing film layer may be used to form the third connection line segment L23 and the fourth connection line segment L24. Thus, it may also be beneficial to reduce the number of masks in the manufacturing process and reduce production costs.

Further, referring to FIG. 26, when the signal shielding layer 40 is introduced into the display panel, the signal shielding layer 40 and the third connection line segment L23 may be arranged in different layers, and the signal shielding layer 40 and the third connection line segment L23 may be arranged on any two layers of the first metal layer M1, the capacitor metal layer MC, the second metal layer M2 and the third metal layer M3, there may also be no need to increase the number of film layers of the display panel for the introduction of the shielding layer 40.

Figure 28:
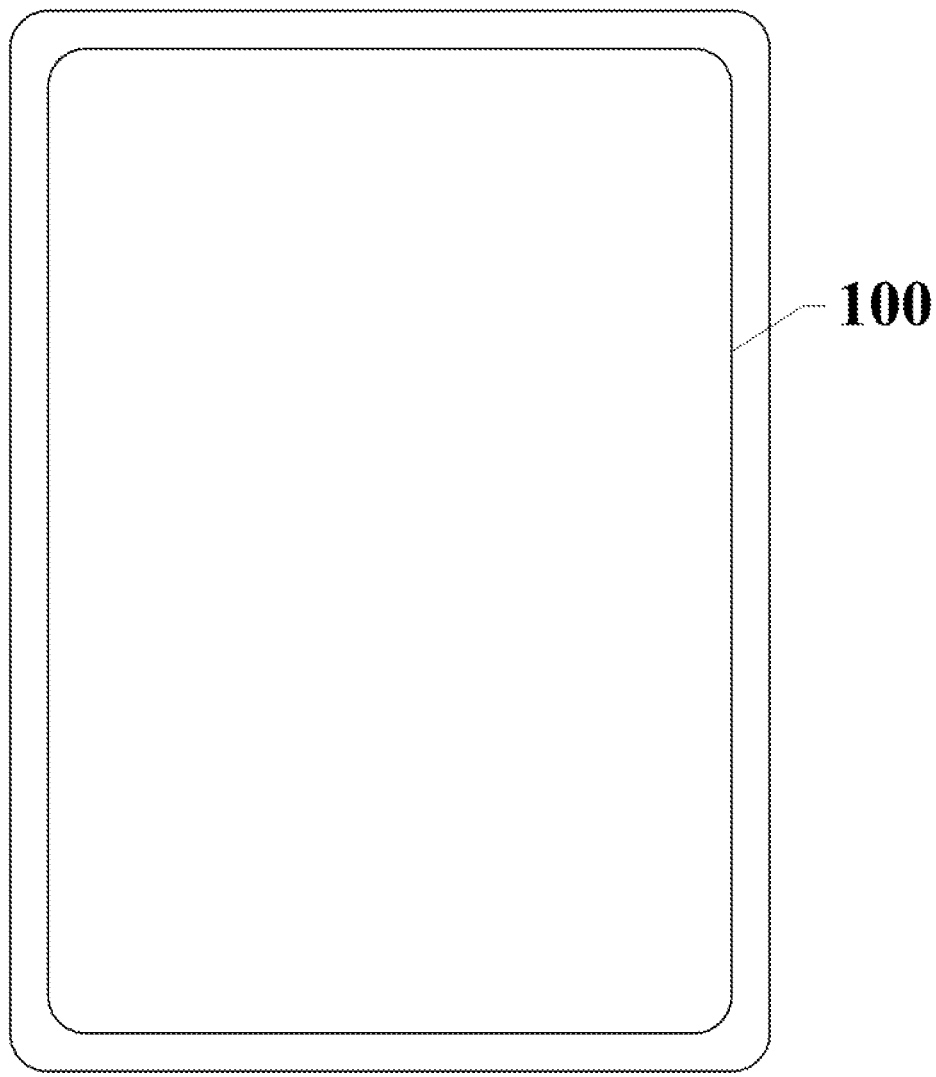
FIG. 28 is a schematic structural diagram of an exemplary display device according to various disclosed embodiments of the present disclosure.

The present disclosure also provides a display device. FIG. 28 is a schematic structural view of an exemplary display device according to various disclosed embodiments of the present disclosure. As shown in FIG. 28, the display device 200 may include any of the display panel 100 provided by the present disclosure, or other appropriate display panel.

It can be understood that the display device provided in the embodiments of the present disclosure may be a computer, a mobile phone, a tablet, or other display devices with a display function, which is not specifically limited in the present disclosure. The display device provided by the embodiments of the present disclosure may include the beneficial effects of the display panel provided by the embodiments of the present disclosure. For details, reference may be made to the specific descriptions of the display panel in the above embodiments, and details will not be repeated here in this embodiment.

It can be known from the above embodiments that the display panel and the display device provided by the present disclosure may at least achieve the following beneficial effects.

In the display panel and the display device provided by the present disclosure, in the first direction, the first display area in the display area may be located on at least one side of the second display area, and a first connection line connected to the first data line may be introduced into the display panel. The first connection line may include a first connection line segment extending in the first direction and a second connection line segment extending in the second direction. The second connection line segment may be located in the second display area, and the two ends of the first connection line segment may be respectively electrically connected to the first data line and the second connection line segment. The second connection line may also be electrically connected to the switch elements in the demultiplexing unit. In such a configuration, a compressed space may be provided for the bottom left frame and/or the bottom right frame of the display panel, which may be beneficial to realize the narrow frame design of the product. In addition, when the second connection line segment is arranged in the second display area, the second connection line segment and the second data line may be arranged on the same layer, which may be beneficial to reduce the number of film layers of the display panel and simplify the production process. The second data lines adjacent to the second connection line segment may be respectively the first sub-data line and the second sub-data line. In the first direction, the second connection line segment may be closer to the aforementioned first sub-data line, and may be farther away from the second sub-data line. Both the first data line and the second data line may be electrically connected to the switch element in the demultiplexing unit, and the first data line may be electrically connected to the aforementioned switch element through a first connection wiring. The control terminal of the switch element connected to the first data line connected to the second connection line segment and the control terminal of the switch element connected to the first sub-data line which is closer to the second connection line segment may be connected to a same switch control line. In such a configuration, the first data line connected to the second connection line segment and the first sub-data line that is closer to the second connection line segment may be simultaneously charged. Therefore, when the second connection line segment is relatively close to the first sub-data line, because the second connection line segment and its adjacent first sub-data line may be charged at the same time or are in a state of waiting to receive a data signal at the same time, it may effectively reduce or avoid the occurrence of the signal coupling between the second connection line segment and the first sub-data line that is closer to it. Thus, it may be beneficial to improve the accuracy and stability of the signal transmitted by the data line, and may be beneficial to improve the overall display effect of the display panel.

Although some specific embodiments of the present disclosure have been described in detail through examples, those skilled in the art should understand that the above examples are for illustration only and not intended to limit the scope of the present disclosure. Those skilled in the art will appreciate that modifications can be made to the above embodiments without departing from the scope and spirit of the disclosure. The scope of the disclosure is defined by the appended claims.

What is claimed is:

1. A display panel, comprising:
   a display area including a first display area and a second display area, wherein the first display area is located at at least one side of the second display area in a first direction;
   a plurality of data lines extending in a second direction and arranged in the first direction, and including a plurality of first data lines located in the first display area and a plurality of second data lines located in the second display area, wherein the first direction intersects the second direction;
   a plurality of first connection wirings including a first connection line segment and a second connection line segment electrically connected to each other, wherein the first connection line segment extends in the first direction and connected to a first data line of the plurality of first data lines, the second connection line segment extends in the second direction and located between two adjacent second data lines of the plurality of second data lines in the second display area, the second connection line segment is disposed on a same layer as the second data line, and the two adjacent second data lines are respectively a first sub-data line and a second sub-data line, and in the first direction, a distance between the second connection line segment and the first sub-data line is D1, a distance between the second connection line segment and the second sub-data line is D2, and D1<D2; and
   a plurality of demultiplexing units including at least two switch elements, wherein the second data line is electrically connected to a switch element of the at least two switch elements, and the first data line is electrically connected to a switch element of the at least two switch elements through the first connection line segment and the second connection line segment, a control terminal of the switch element corresponding to the first data line connected to the second connection line segment and a control terminal of the switch element corresponding to the first sub-data line is connected to a same switch control line, and the control terminal of the switch element corresponding to the first data line connected to the second connection line segment and the control terminal of the switch element corresponding to the second sub-data line are connected to different switch control lines.

2. The display panel according to claim 1, wherein: 2 m≤D1≤3 μm.

3. The display panel according to claim 1, wherein: D2/D1≥15.

4. The display panel according to claim 1, wherein a demultiplexing unit of the plurality of demultiplexing units comprises:
   the two switch elements,
   wherein:
   the switch element of the two switch elements includes a control terminal, an input terminal and an output terminal;
   the input terminals of the two switch elements of a same demultiplexing unit are connected;
   the output terminals of the two switch elements of the demultiplexing unit are connected to different data lines in one-to-one correspondence; and
   the control terminals of the two switch elements of the demultiplexing unit are connected to the two switch control lines in one-to-one correspondence.

5. The display panel according to claim 1, comprising:
   a first pixel column and a second pixel column arranged in the first direction,
   wherein:
   the first pixel column includes sub-pixels of a first color and sub-pixels of a second color arranged in the second direction;
   the second pixel column includes sub-pixels of a third color arranged in the second direction;
   at least one first data line of the plurality of first data lines connected to the second connection line segment is electrically connected to the first pixel column in the first display area; and
   a first sub-data line of the plurality of first sub-data lines adjacent to the second connection line segment is electrically connected with the first pixel column in the second display area.

6. The display panel according to claim 1, comprising:
   a first pixel column and a second pixel column arranged in the first direction,
   wherein:
   the first pixel column includes sub-pixels of a first color and sub-pixels of a second color arranged in the second direction;
   the second pixel column includes sub-pixels of a third color arranged in the second direction;
   at least one first data line of the plurality of first data lines connected to the second connection line segment is electrically connected to the second pixel column in the first display area; and
   a first sub-data line of the plurality of first sub-data lines adjacent to the second connection line segment is electrically connected with the second pixel column in the second display area.

7. The display panel according to claim 1, comprising:
   a plurality of pixel rows,
   wherein:
   the plurality of pixel rows include sub-pixels of a first color and sub-pixels of a second color arranged in the first direction; and
   in a same pixel row, a sub-pixel connected to the first data line connected by the second connection line segment is a sub-pixel of the first color, and a sub-pixel connected by the first sub-data line adjacent to the second connection line segment is a sub-pixel of the first color; or, in the same pixel row, a sub-pixel connected to the first data line connected by the second connection line segment is a sub-pixel of the second color, and a sub-pixel connected to the first sub-data line adjacent to the second connection line segment is a sub-pixel of the second color.

8. The display panel according to claim 1, comprising:
   a plurality of pixel rows,
   wherein:
   the plurality of pixel rows include sub-pixels of a first color and sub-pixels of a second color arranged in the first direction; and
   in a same pixel row, a sub-pixel connected to the first data line connected by the second connection line segment is a sub-pixel of the first color, and a sub-pixel connected by the first data line adjacent to the second connection line segment is a sub-pixel of the first color; and a sub-pixel connected to the first sub-data line connected to the second connection line segment is a sub-pixel of the second color.

9. The display panel according to claim 1, wherein:
among the first sub-data line and the second sub-data line adjacent to the second connection line segment, in the first direction, the first sub-data line is located between the second sub-data line and the first display area, and the first display area is a first display area where the first data line connected to the second connection line segment is located.

10. The display panel according to claim 1, wherein:
among the first sub-data line and the second sub-data line adjacent to the second connection line segment, in the first direction, the second sub-data line is located between the first sub-data line and the first display area, and the first display area is a first display area where the first data line connected to the second connection line segment is located.

11. The display panel according to claim 1, wherein:
in the first direction, the first display area is located on at two sides of the second display area;
the second display area includes a first sub-display area and a second sub-display area arranged in the first direction;
the second connection line segments in the first sub-display area and the second sub-display area are symmetrically arranged in a first axis of symmetry; and
the first axis of symmetry extends in the second direction and is located between the first sub-display area and the second sub-display area.

12. The display panel according to claim 11, wherein:
in the first sub-display area and the second sub-display area, among the first sub-data line and the second sub-data line adjacent to the second connection line segment, the first sub-data line is located at a side of the second connection line segment away from the first symmetry axis; or, the first sub-data line is located at a side of the second connection line segment adjacent to the first symmetry axis.

13. The display panel according to claim 1, further comprising:
an optical device area, wherein the display area surrounds the optical device area, the plurality of data lines also include a third data line, and the third data line is broken by the optical device area to form a first line segment and a second line segment; and
a plurality of second connection wirings, wherein a second connection wiring of the plurality of second connection wirings includes a third connection line segment and a fourth connection line segment connected to each other, the third connection line segment extends in the first direction, the fourth connection line segment extends in the second direction, the first connection line segment and the second connection line segment are electrically connected to a same fourth connection line segment through different third connection line segments, at least one fourth connection line segment and at least one third connection line segment are located in the display area, and the fourth connection line segment is disposed on a same layer as the third data line.

14. The display panel according to claim 13, wherein:
in the display area, the fourth connection line segment is located between two adjacent data lines, and the two adjacent data lines are respectively the third sub-data line and the fourth sub-data line, in the first direction, the distance between the fourth connection line segment and the third sub-data line is D3, the distance between the fourth connection line segment and the fourth sub-data line is D4, and D3<D4; and
a control terminal of the switch element corresponding to the third data line connected to the fourth connection line segment and a control terminal of the switch element corresponding to the third sub-data line are connected to a same switch control line; and a control terminal of the switch element corresponding to the third data line connected to the fourth connection line segment and a control terminal of the switch element corresponding to the fourth sub-data line are connected to different switch control lines.

15. The display panel according to claim 13, wherein:
the first sub-data line adjacent to the second connection line segment and the third sub-data line adjacent to the fourth connection line segment are a same data line; and
a control terminal of the switch element corresponding to the first data line connected to the second connection line segment and a control terminal of the switch element corresponding to the third data line connected to the fourth connection line segment is connected to a same switch control line.

16. The display panel according to claim 13, further comprising:
a non-display area at least partially surrounding the display area, wherein the non-display area includes a first non-display area located at one side of the display area in the second direction, and at least a portion of the third connection line segment is located in the first non-display area.

17. The display panel according to claim 16, further comprising:
a signal shielding layer disposed in the first non-display area;
in the first non-display area, an orthographic projection of the third connection line segment onto a light-exiting surface of the display panel overlaps an orthographic projection of the signal shielding layer onto the light-exiting surface of the display panel; and
the signal shielding layer receives a constant potential.

18. The display panel according to claim 1, comprising:
a substrate; and
a first metal layer, a capacitor metal layer, a second metal layer and a third metal layer arranged on one side of the substrate,
wherein:
in a thickness direction of the display panel, the capacitor metal layer is located on a side of the first metal layer away from the substrate, the second metal layer is located on a side of the capacitor metal layer away from the substrate, and the third metal layer is located on a side of the second metal layer away from the substrate; and
the data line and the second connection line segment are located on the second metal layer, the first connection line segment is located on at least one of the first metal layer, the capacitor metal layer, and the third metal layer, or, the data line and the second connection line segment are located on the third metal layer, and the first connection line segment is located on at least one of the first metal layer, the capacitor metal layer, and the second metal layer.

19. A display device, comprising:
a display panel, including:

a display area including a first display area and a second display area, wherein the first display area is located on at least one side of the second display area in a first direction;

a plurality of data lines extending in second direction and arranged in the first direction, and including a plurality of first data lines located in the first display area and a plurality of second data lines located in the second display area, wherein the first direction intersects the second direction;

a plurality of first connection wirings including a first connection line segment and a second connection line segment electrically connected to each other, wherein the first connection line segment extends in the first direction and connected to a first data line of the plurality of first data line, the second connection line segment extends in the second direction and located between two adjacent second data lines of the plurality of second data lines in the second display area, the second connection line segment is disposed on a same layer as the second data line, and the two adjacent second data lines are respectively a first sub-data line and a second sub-data line, and in the first direction, a distance between the second connection line segment and the first sub-data line is D1, a distance between the second connection line segment and the second sub-data line is D2, and D1<D2; and a plurality of demultiplexing units including at least two switch elements, wherein the second data line is electrically connected to a switch element of the at least two switch elements, and the first data line is electrically connected to a switch element of the at least two switch elements through the first connection line segment and the second connection line segment, a control terminal of the switch element corresponding to the first data line connected to the second connection line segment and a control terminal of the switch element corresponding to the first sub-data line is connected to a same switch control line, and the control terminal of the switch element corresponding to the first data line connected to the second connection line segment and the control terminal of the switch element corresponding to the second sub-data line are connected to different switch control lines.

\* \* \* \* \*